May 7, 1940.  G. W. ALLAN ET AL  2,199,772
TYPOGRAPHICAL COMPOSING MACHINE
Filed Sept. 23, 1939  19 Sheets-Sheet 4
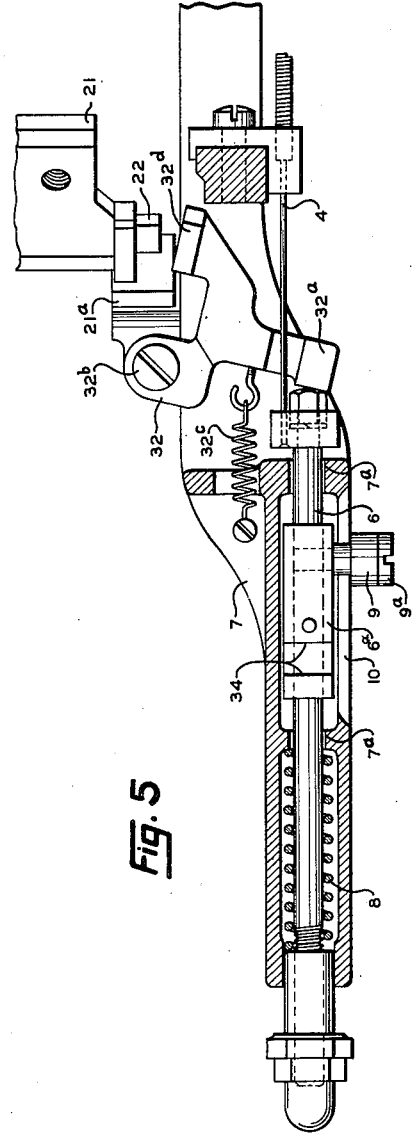
INVENTORS
GEORGE W. ALLAN
ALBERT H. SIMPSON
BY
ATTORNEY

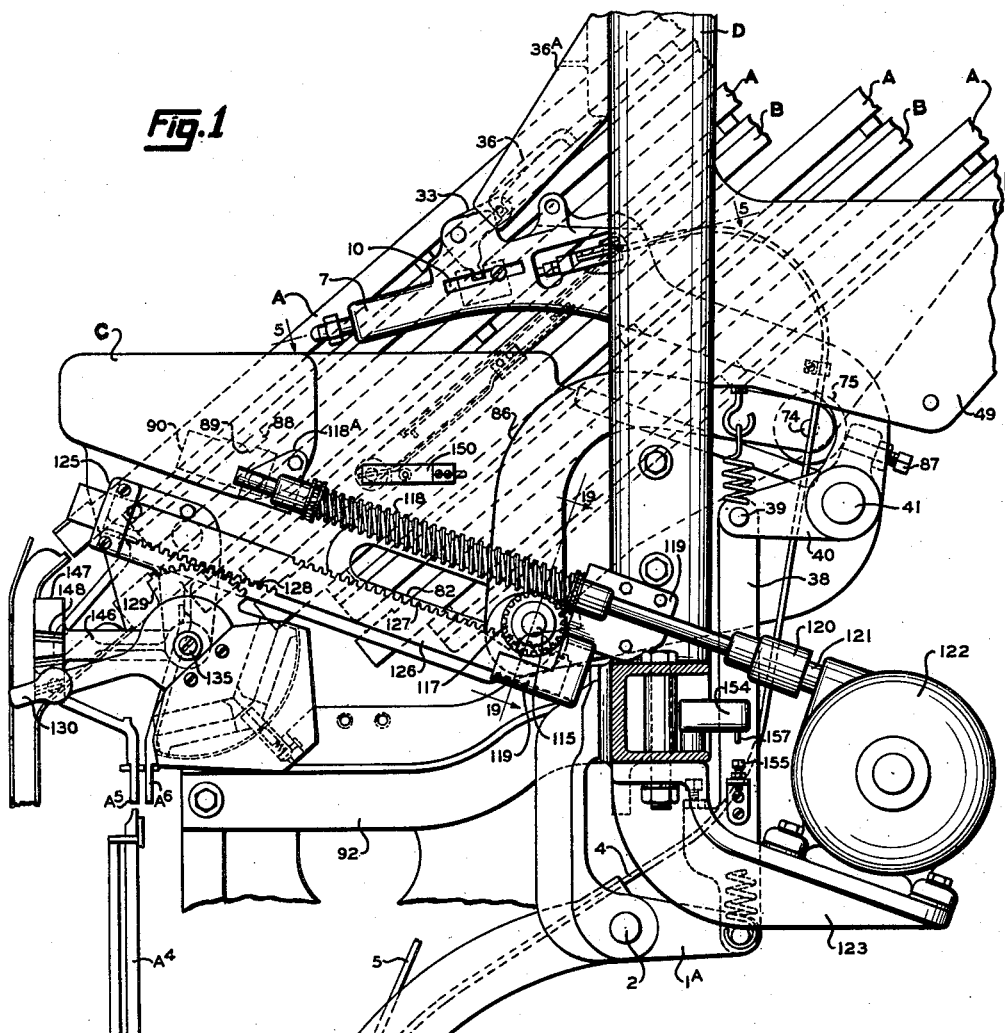

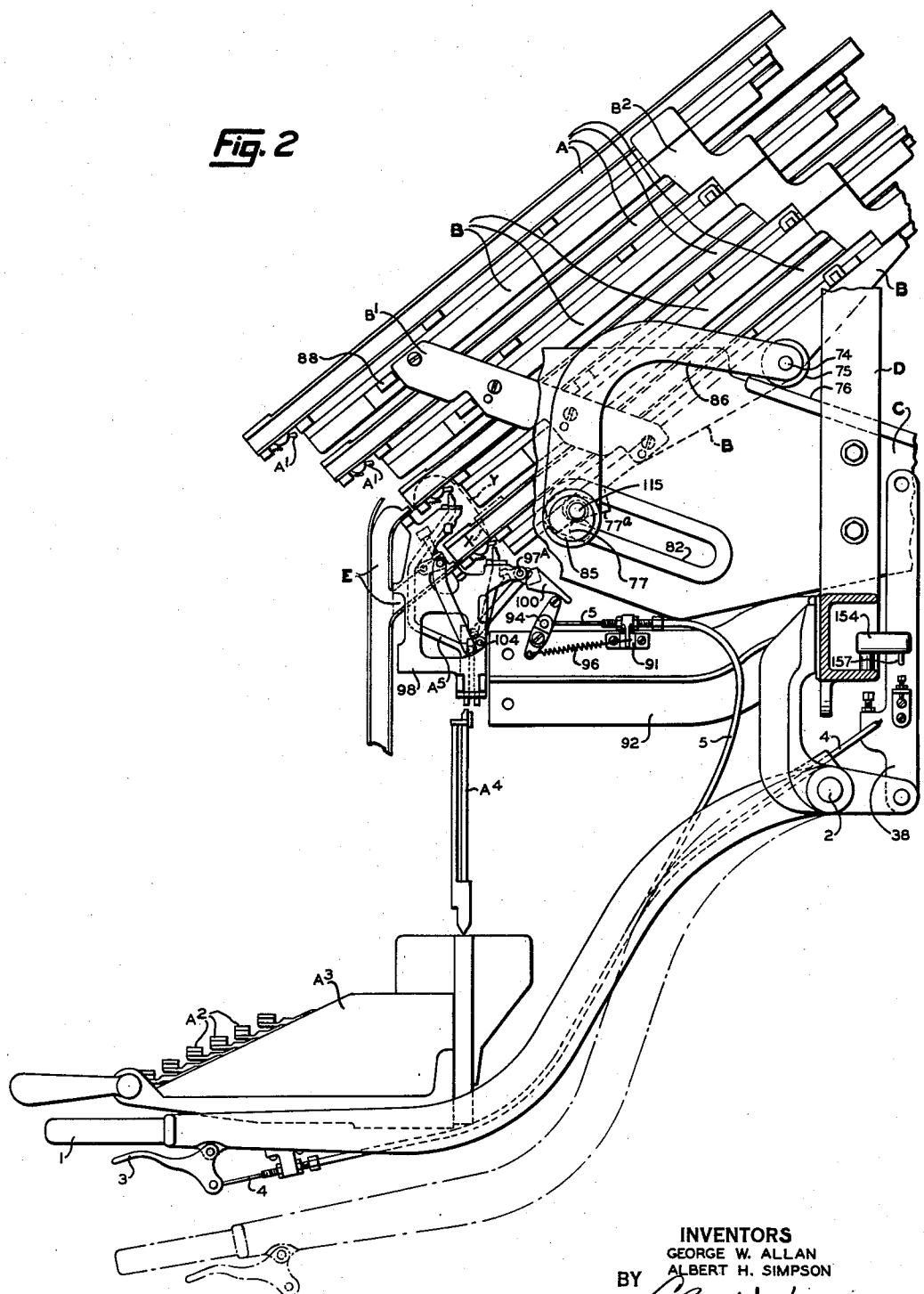

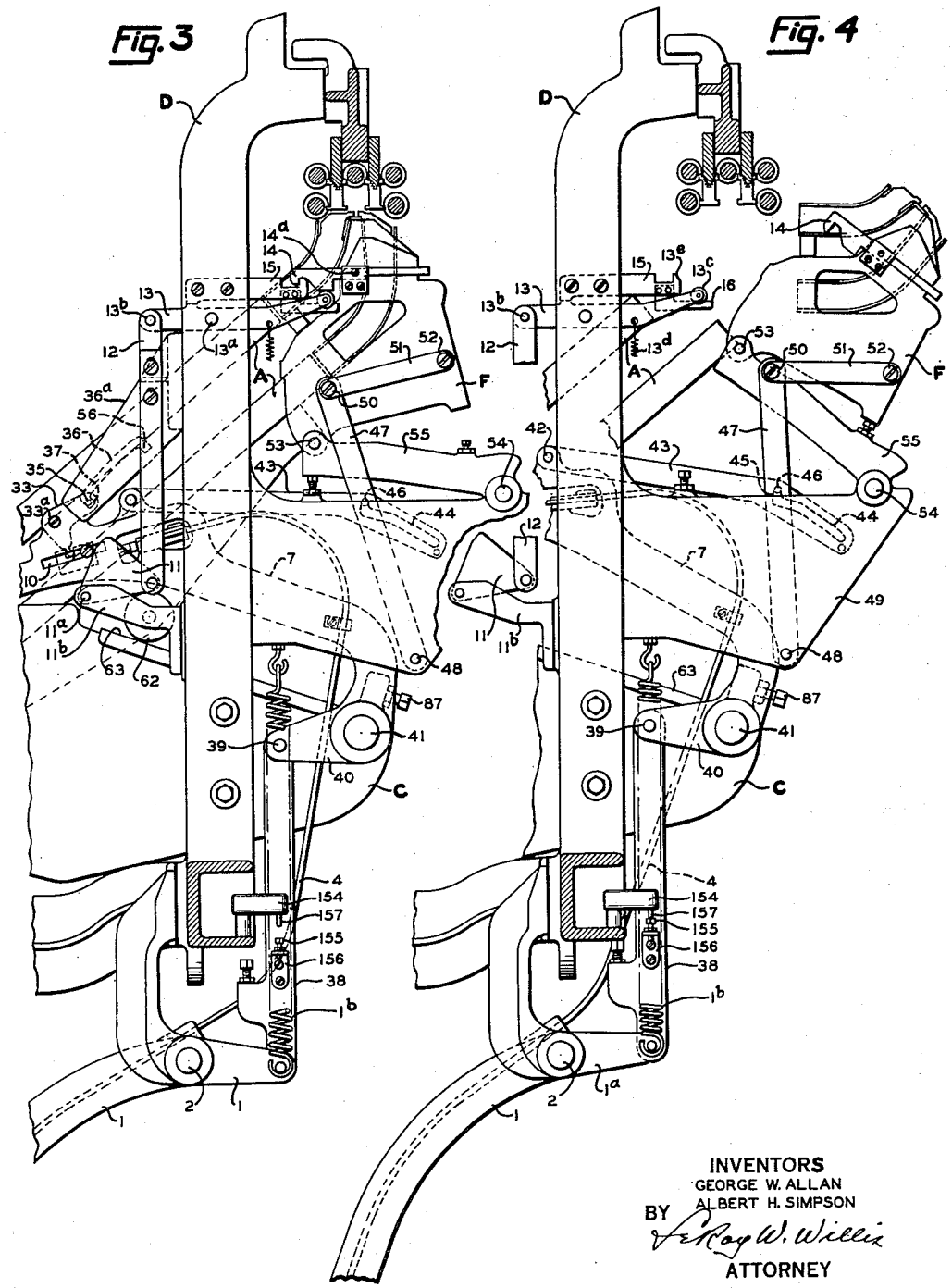

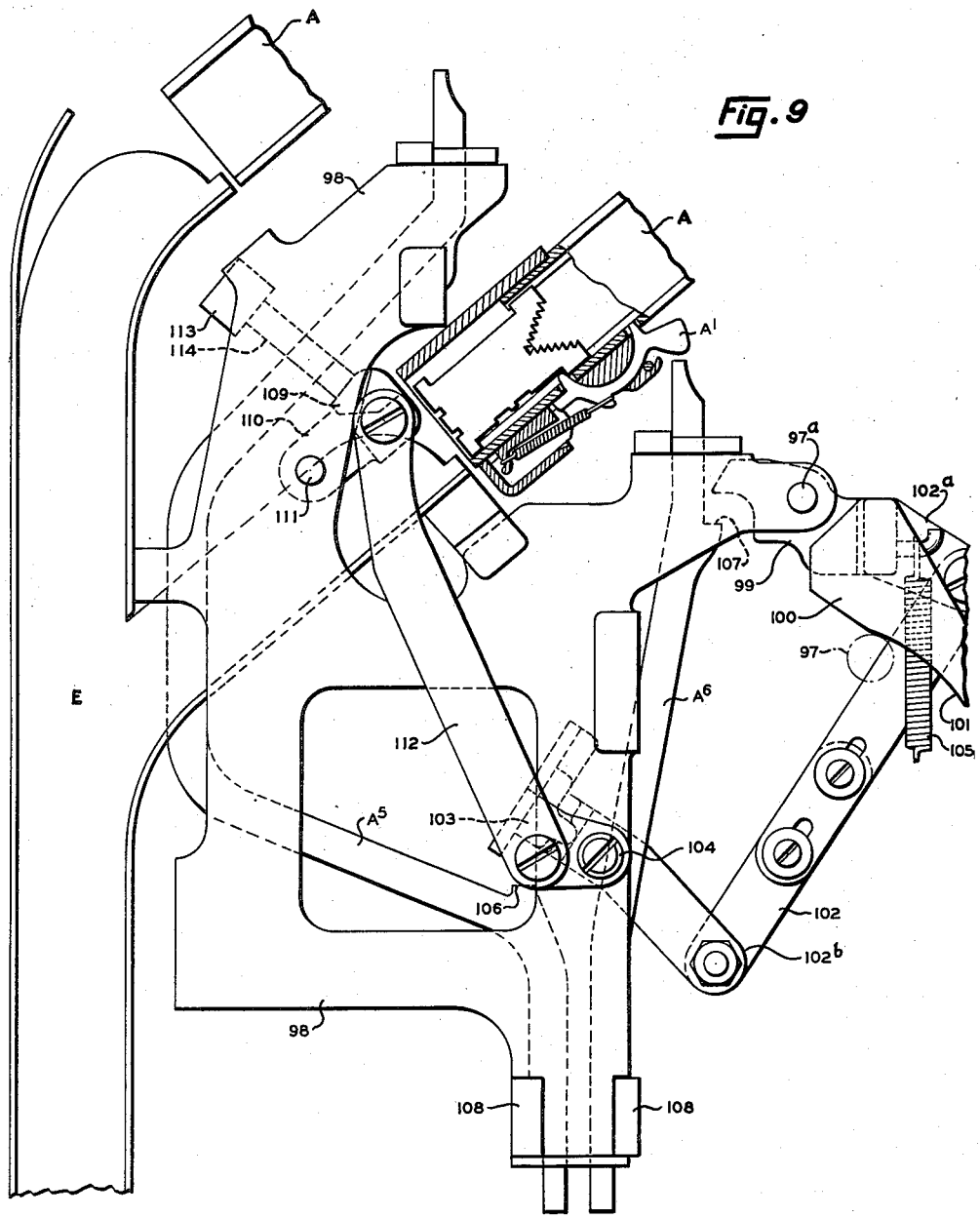

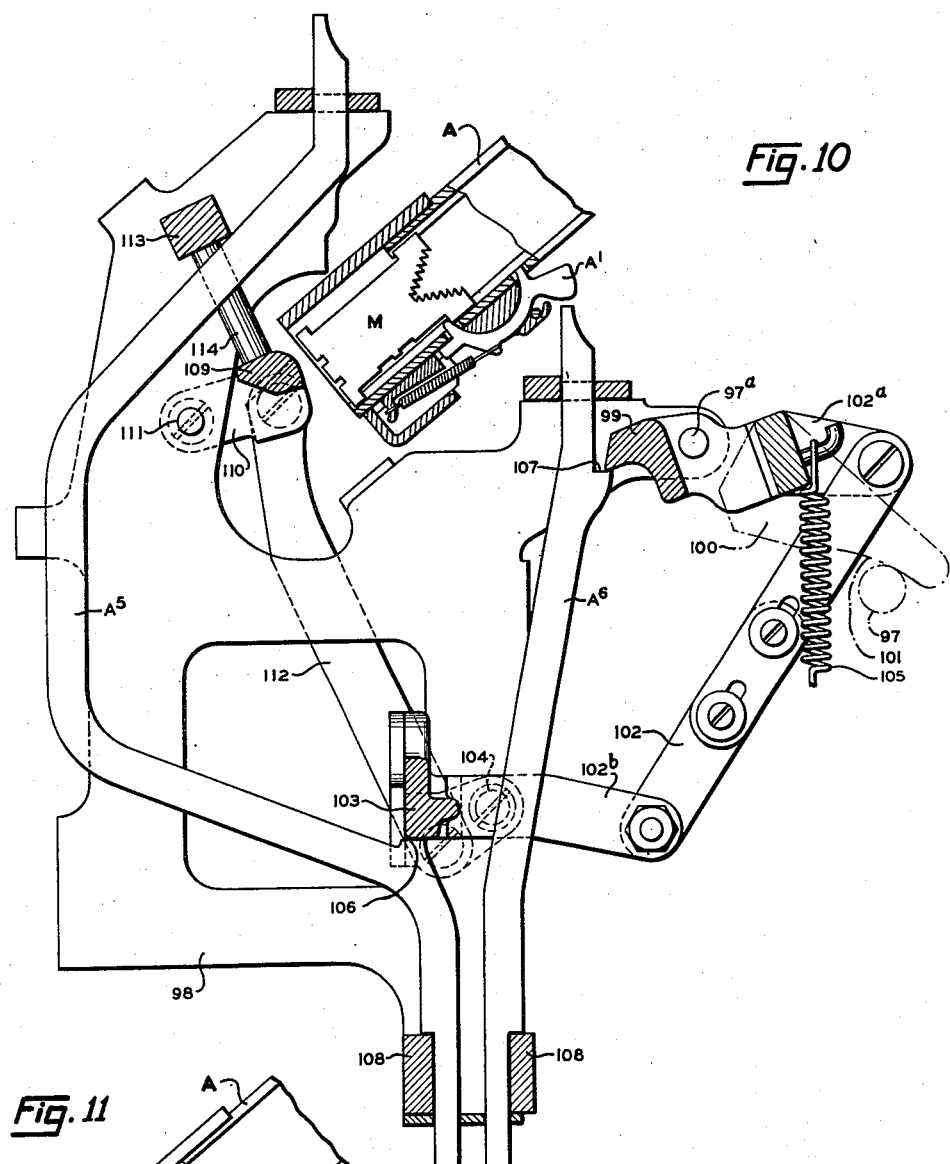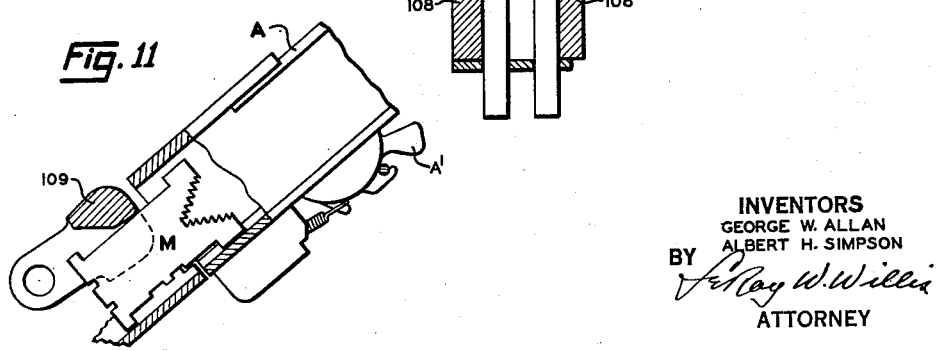

May 7, 1940.  G. W. ALLAN ET AL  2,199,772
TYPOGRAPHICAL COMPOSING MACHINE
Filed Sept. 23, 1939  19 Sheets-Sheet 8

INVENTORS
GEORGE W. ALLAN
ALBERT H. SIMPSON
BY
*LeRay W. Willis*
ATTORNEY

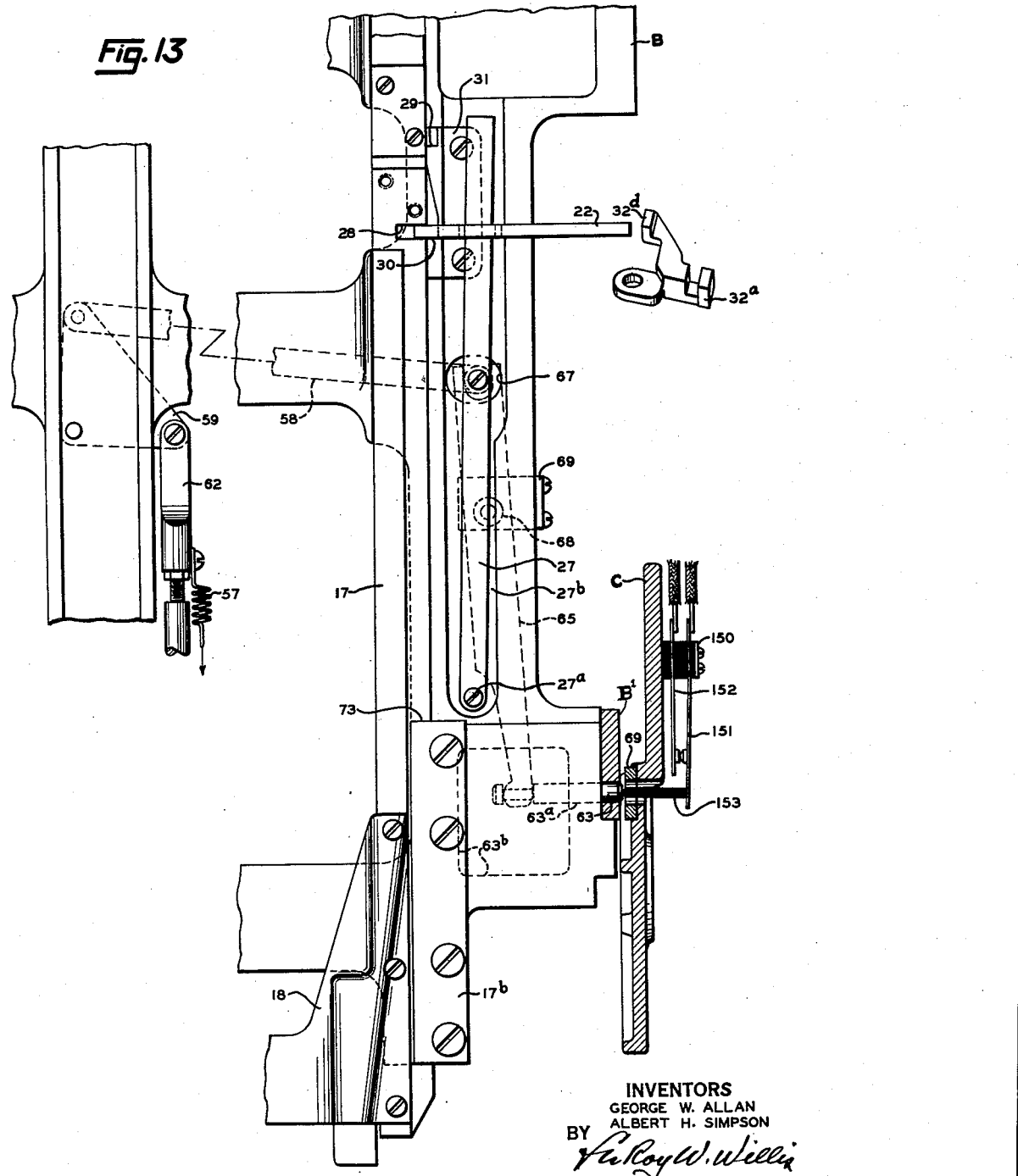

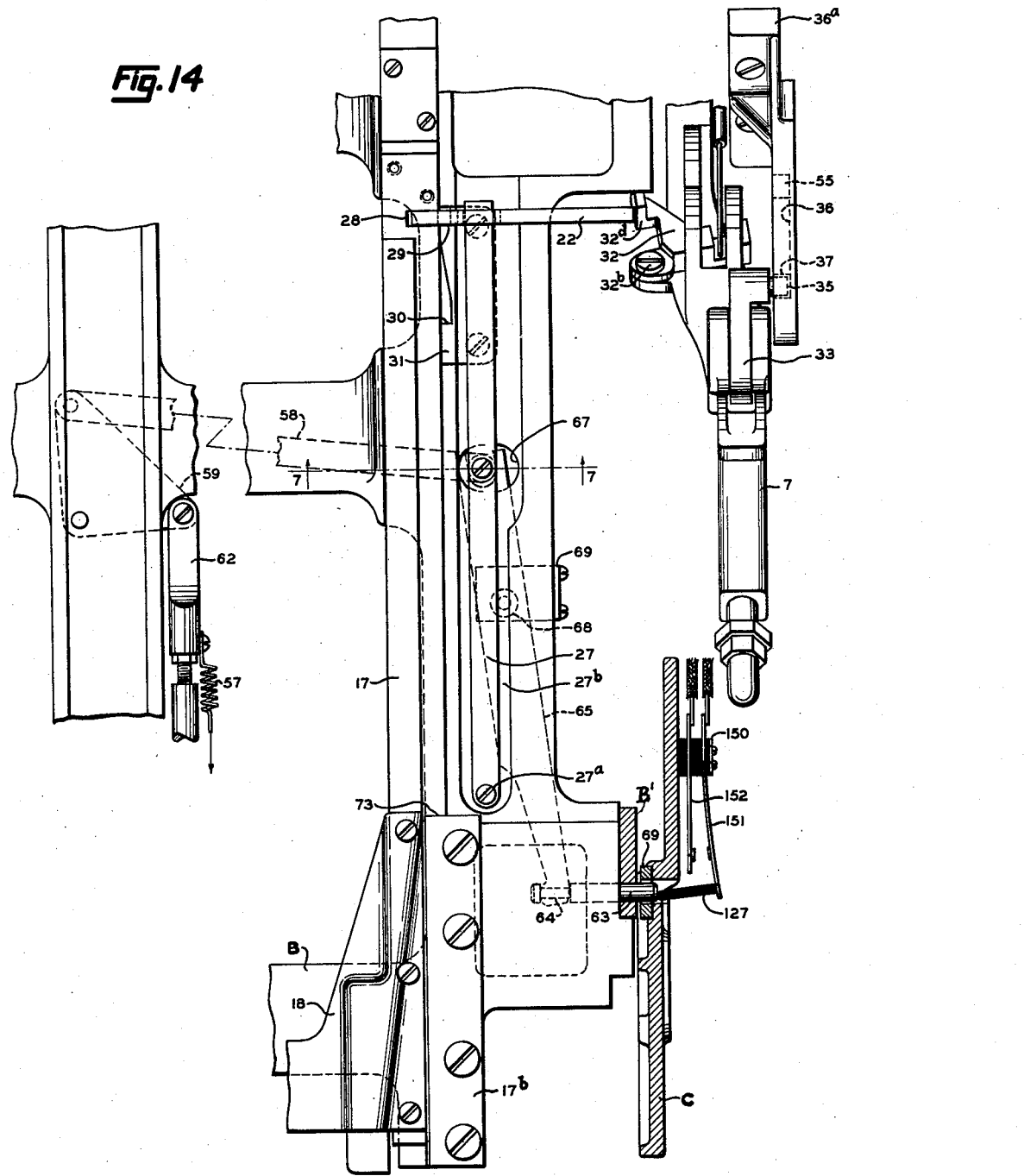

May 7, 1940. G. W. ALLAN ET AL 2,199,772
TYPOGRAPHICAL COMPOSING MACHINE
Filed Sept. 23, 1939 19 Sheets-Sheet 11
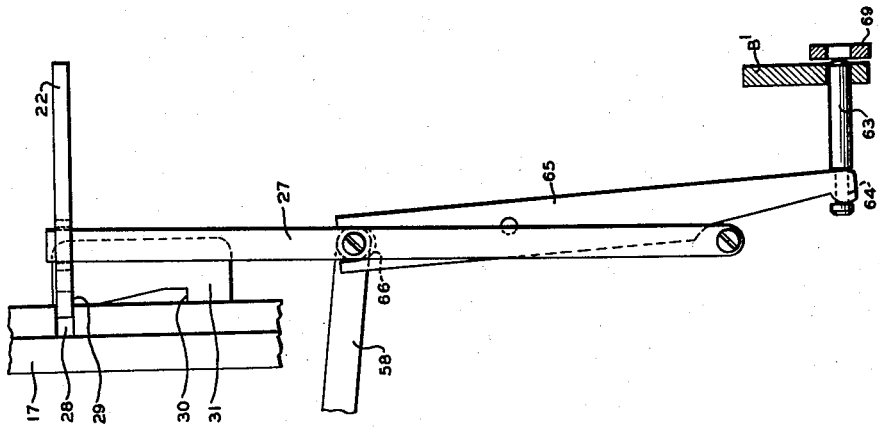
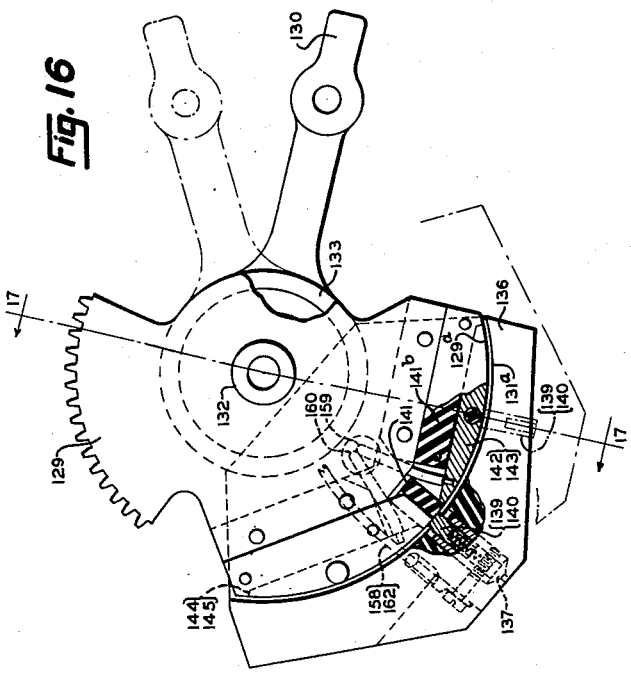
INVENTORS
GEORGE W. ALLAN
ALBERT H. SIMPSON
BY
ATTORNEY

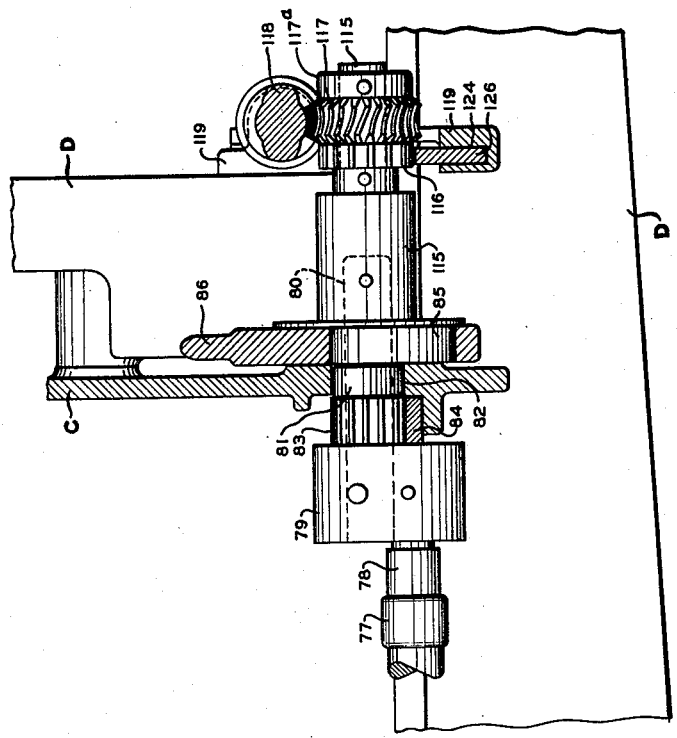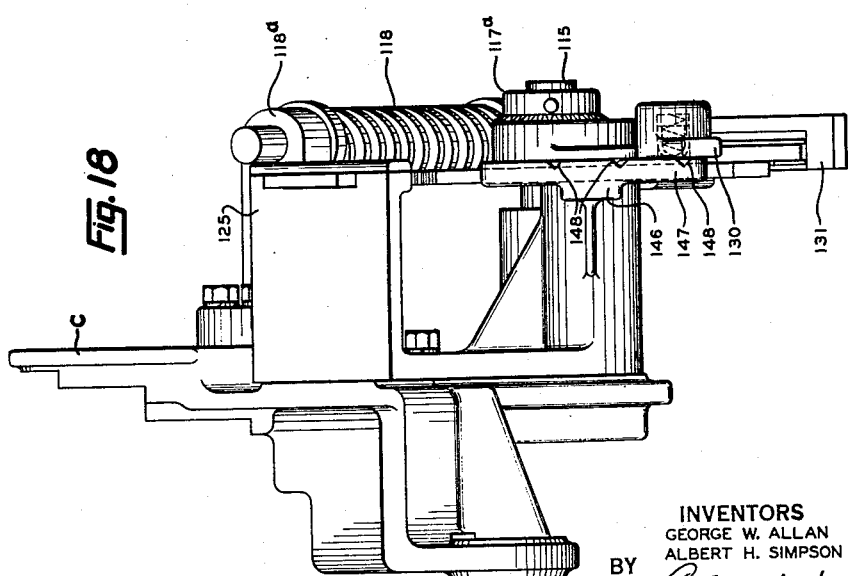

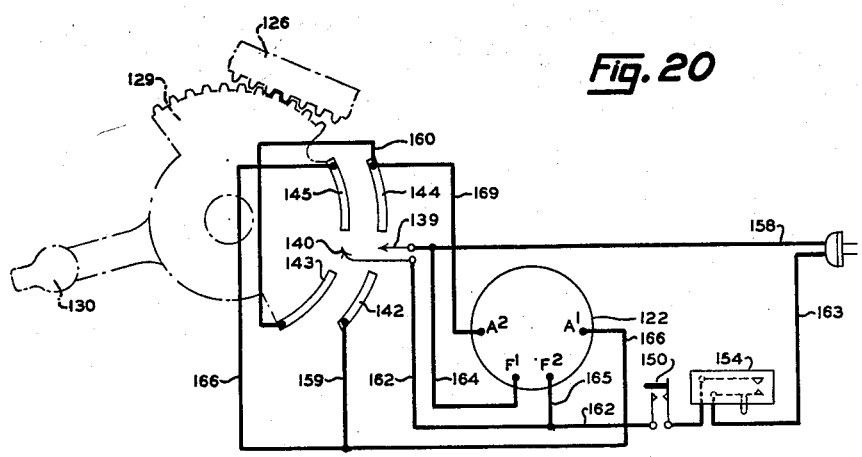
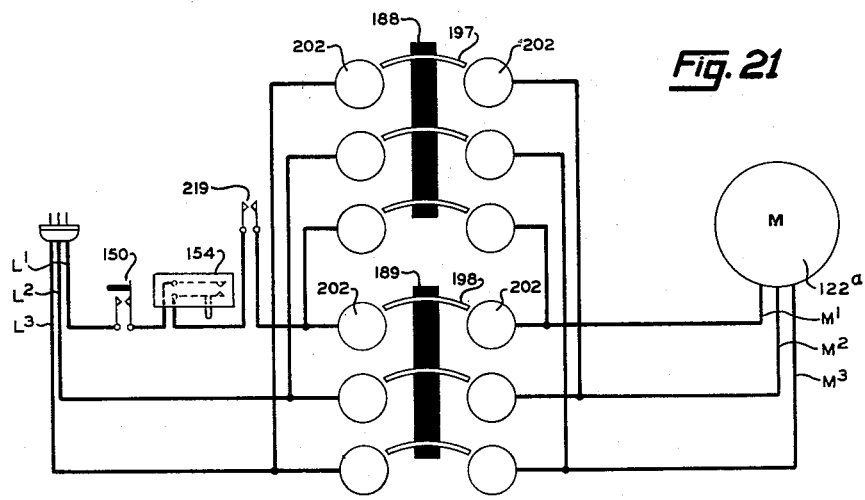

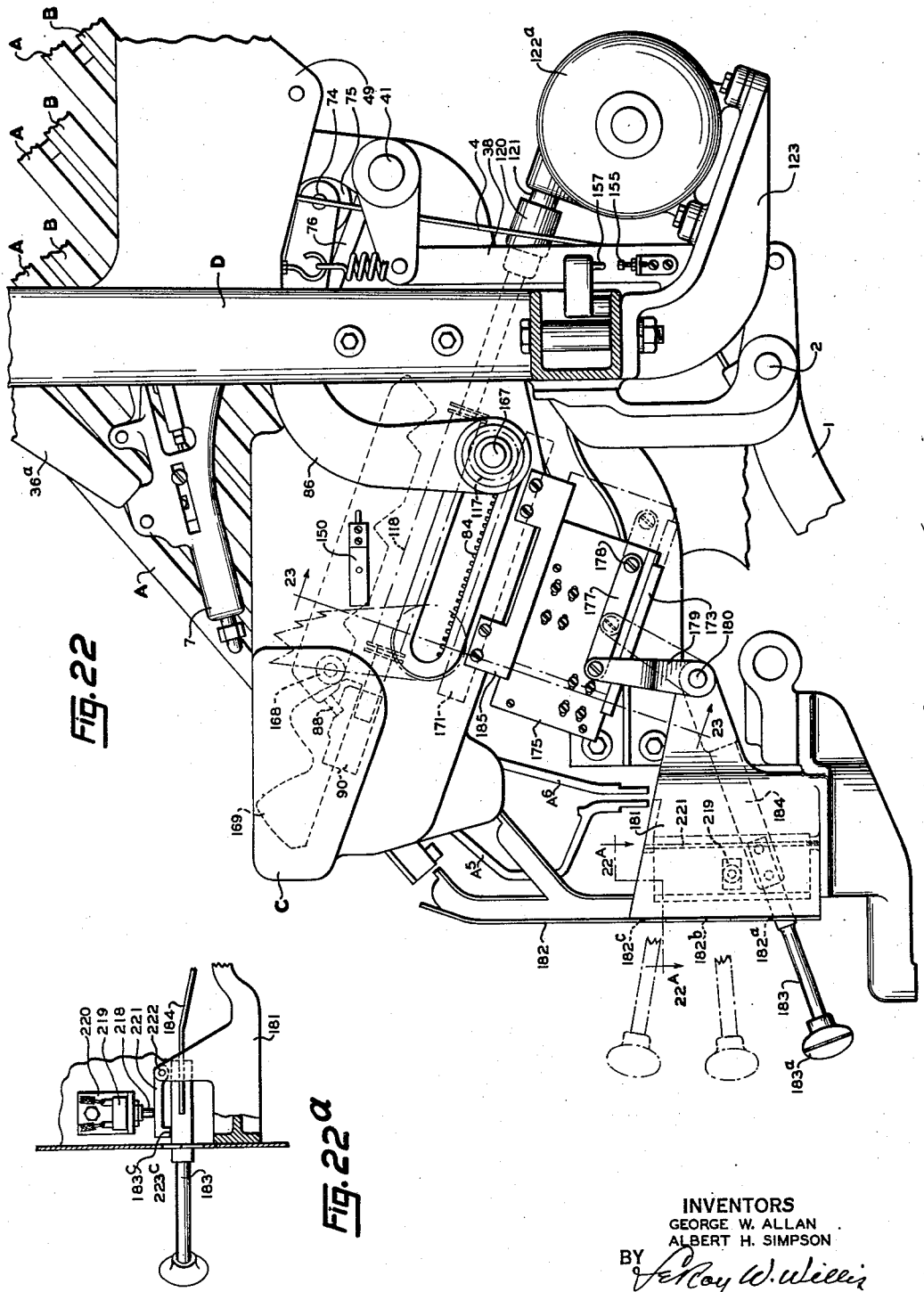

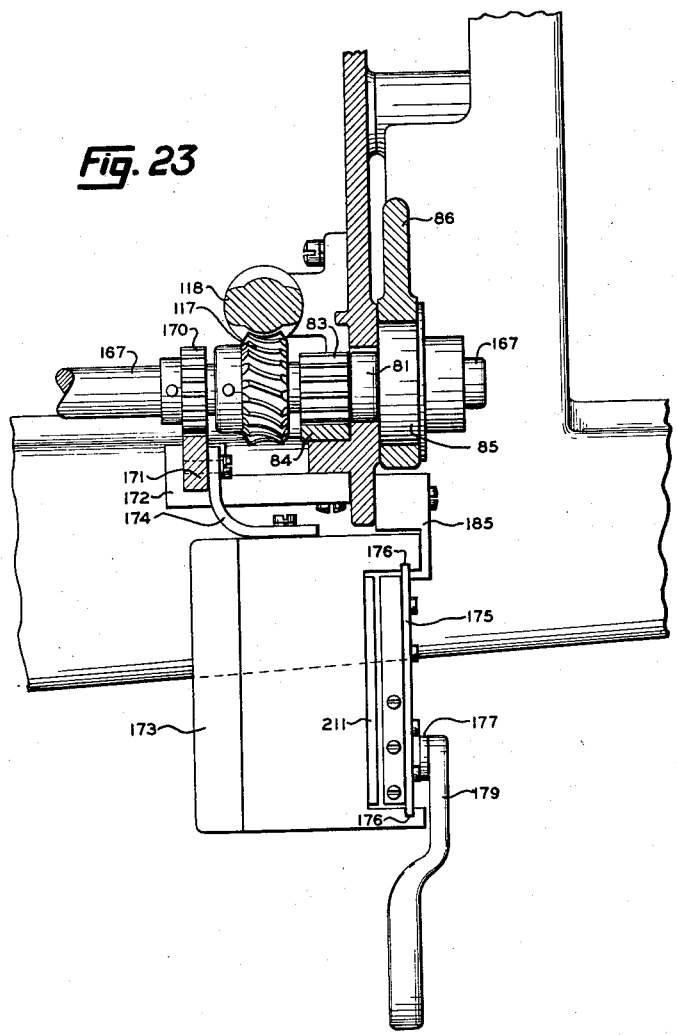

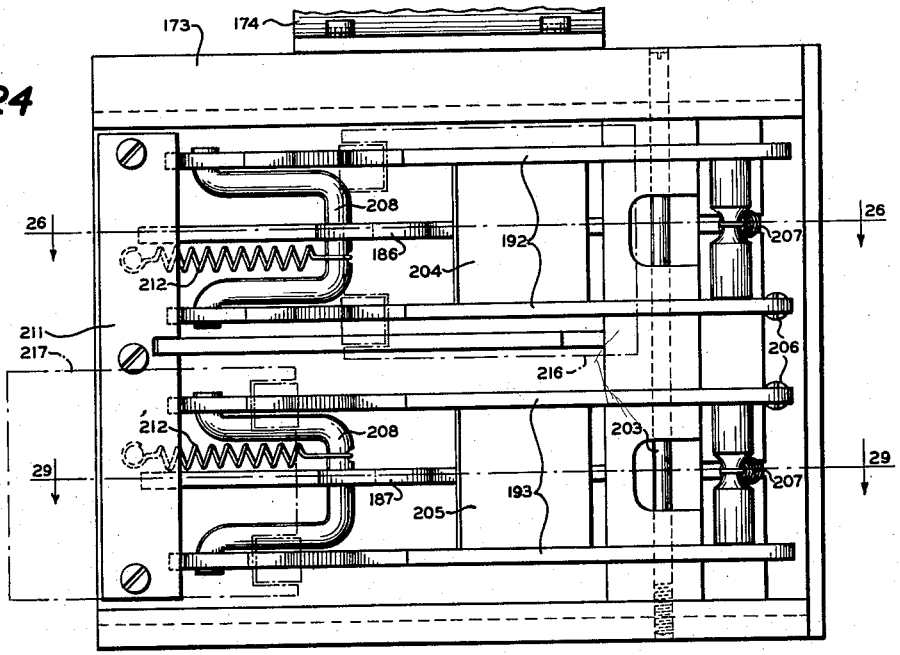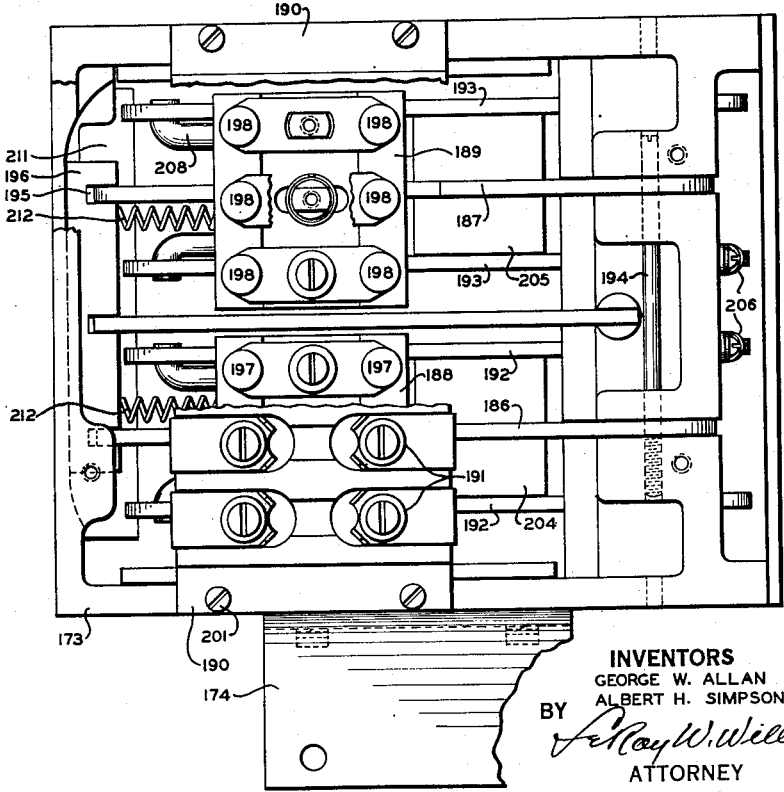

May 7, 1940. G. W. ALLAN ET AL 2,199,772
TYPOGRAPHICAL COMPOSING MACHINE
Filed Sept. 23, 1939 19 Sheets-Sheet 17
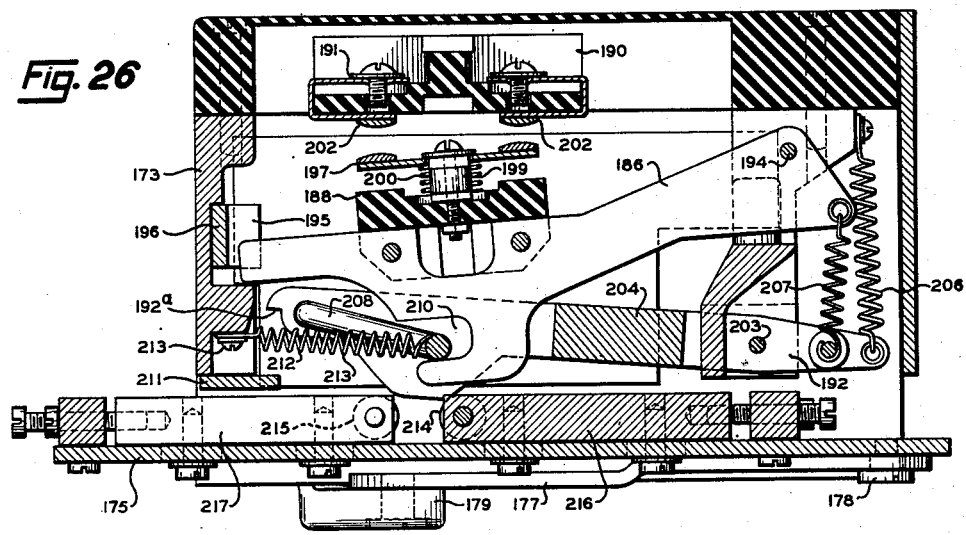
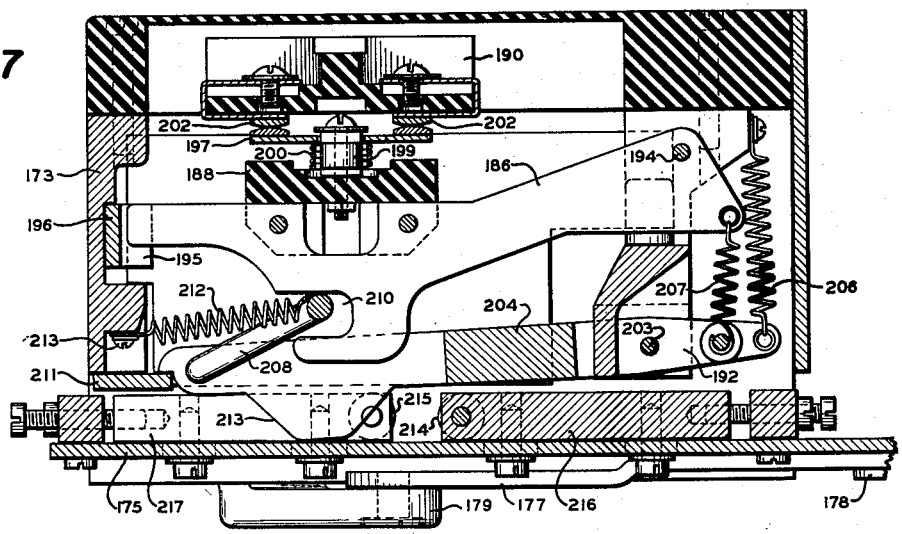
INVENTORS
GEORGE W. ALLAN
ALBERT H. SIMPSON
BY
ATTORNEY

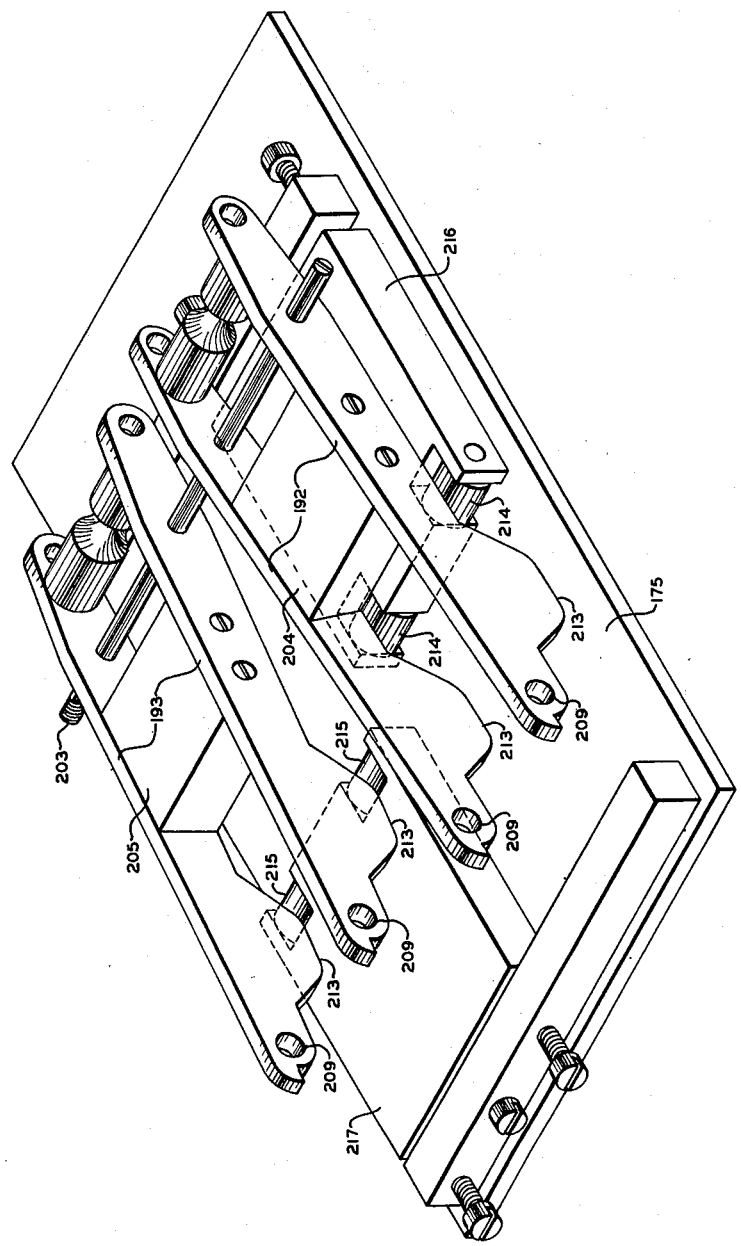

Patented May 7, 1940

2,199,772

UNITED STATES PATENT OFFICE 2,199,772

TYPOGRAPHICAL COMPOSING MACHINE

George W. Allan and Albert H. Simpson, Brooklyn, N. Y., assignors to Intertype Corporation, Brooklyn, N. Y., a corporation of New York Application September 23, 1939, Serial No. 296,194

35 Claims. (Cl. 199—45)

The present invention relates to improvements in typographical slug casting machines of the general organization represented in U. S. Letters Patent 436,532, granted September 16, 1890, wherein character bearing matrices stored in channeled magazines are released therefrom in response to manipulation of a keyboard and assembled into lines, the lines then being presented before a mold in which the type bearing slugs are cast and the matrices being subsequently transferred to the distributing mechanism of the machine which returns them to their respective channels in the magazine from which they were drawn. More particularly, the invention relates to machines of the class referred to equipped with a plurality of superposed magazines, either main or auxiliary stacks thereof, which are shiftable as a unit in order to bring one or another magazine, or a pair of magazines, into operative relation with the matrix assembling and distributing devices of the machine.

The improvements according to the present invention deal with the provision of a power drive for shifting the magazine unit, which drive is entirely independent of the usual mechanism provided for driving the machine proper, thus avoiding the complications and expense involved through the use of mechanical clutch mechanisms as heretofore proposed for operating the magazine shift from the machine driving devices. Further, the invention deals with novel control means to which such power drive is responsive, the arrangement being such as to enable the operator of the machine to signal for a desired magazine or pair of magazines merely by setting a magazine selecting lever whereby, regardless of which magazine or pair thereof may last have been in operating position, the newly desired one will automatically move into place—and this, without regard to whether an upward or a downward movement of the unit is required and without interruption to operation of the shifting mechanism until the selected magazine arrives in operating position. Further improvements according to the invention relate to safety devices for assuring, preparatory to initiating a shifting operation, a clear path through which the magazines may move without obstruction from or damage to associated parts of the machine. Response of the power shifting mechanism to its control means is preferably made dependent upon the proper conditioning of at least some of such safety devices through electrical circuits associated with the circuit to the driving motor.

While the invention is applicable to multiple magazine machines in general, without regard to any particular form or arrangement of the magazines or to special requirements due to variations in construction, mounting and mode of operation of the shiftable unit of magazines, the present improvements are herein illustrated as applied to machines substantially similar to those disclosed in U. S. Letters Patent Nos. 1,650,552 granted November 22, 1927, 1,988,417 granted January 15, 1935, and 2,103,980 granted December 28, 1927, wherein each magazine carries its own set of matrix escapements located somewhat back from the forward end of the magazines, and in order to clear the actuating connections interposed between the keyboard and such escapements the lower end of the magazine unit is raised and lowered, either by eccentrics or cams, as the unit is translated bodily in shifting from one operating position to another. This particular arrangement further requires that the channel entrance of the machine be opened and closed respectively before and after each shifting operation.

According to the present invention the power drive for shifting the magazine unit comprises a reversible electric motor of the speed reduction type having a threaded spindle coupled to its drive shaft for driving a worm wheel with which it remains in mesh at all times, the worm wheel being directly associated with the magazine shifting devices. In the illustrated embodiments of the invention the driven worm wheel supplants the manual shift handle fixed to the magazine shifting shaft in the patents above referred to wherein spur gears on said shaft engage stationary toothed racks fixed to each side of the machine frame so that when the shaft is turned in either direction the magazine unit is correspondingly moved. The threaded spindle on the drive shaft of the motor is long enough to drive the worm wheel and consequently the shifting shaft over the full range necessary to shift from the uppermost to the lowermost magazine and vice versa.

The novel control means provided in conjunction with the aforesaid directly and constantly coupled driving mechanism comprises a switch device having two relatively movable elements containing opposed conducting and non-conducting sectors through which the motor circuit may be made and broken. One element is connected to a manually settable magazine selecting lever located accessible to the operator at the front of the machine and the other element is connected to a floating rack bar provided with teeth which engage a spur gear on the magazine shifting shaft. Whenever the magazine selecting lever is set to a new position designating a new magazine location as displayed on an index plate on the switch device, the switch element connected to said lever is moved relative to the other switch element. This results in closing the motor circuit through opposed conducting portions on the two switch elements and thus shifting the magazine unit. Since said other switch element is connected through the floating rack bar to the magazine shifting shaft said switch element is moved during the shifting operation until non-conducting portions of both elements of the switch are opposed. The spur gear which moves the floating rack bar is of a different pitch diameter than the pinions on the magazine shifting shaft in order to move the bar at a different rate than that of the magazine unit. Thus, movement of the rack bar and its associated switch element is in timed relation to, and determined by, the extent of movement of the magazine unit and the timing is such that the motor circuit is broken as soon as the selected magazine arrives in operating position. For each magazine location, however, the switch elements and rack bar obviously occupy a different position or setting.

In another embodiment of the control means the relatively movable elements of the switch device comprise a box containing two sets of electrical contacts and a camming element therefor connected to the magazine selecting lever, instead of the opposed conducting and non-conducting sectors already referred to, the function of the switch device being otherwise the same as described above. With either embodiment the operator may signal for a desired magazine, whether it be located in the stacked unit of magazines adjacent to or remote from the magazine last in use, simply by setting the selecting lever, the driving mechanism being directly responsive thereto through the switch device which controls its operation automatically and without interruption until the magazine unit has been moved the full extent from the old to the newly desired magazine location.

In the accompanying drawings, the invention is shown merely in preferred form and by way of example, many changes and variations obviously being possible to suit different adaptations of the invention according to varying conditions in the general construction of the particular machine to which it may be desired to apply it. It is to be understood, therefore, that the invention is not limited to any specific form or embodiment, except as such limitations are expressed in the claims.

Referring to the drawings:

Fig. 1 is a side elevation of a portion of a typographical machine having applied thereto the power driving mechanism and control means of the invention.

Fig. 2 is similar to Fig. 1 but with certain parts including the power driving mechanism removed in order to show certain safety devices and operating means therefor.

Fig. 3 is a continuation of Fig. 2 showing safety devices associated with the channel entrance of the machine in closed position.

Fig. 4 is similar to Fig. 3 but shows the position of the safety devices when the channel entrance is in open position.

Fig. 5 is a plan view in section on line 5—5 of Fig. 1 showing details of construction of the magazine retracting arm in Fig. 1.

Fig. 6 is a fragmentary section taken on the line 6—6 of Fig. 7, showing the magazine locking bolt, one of the safety devices of the invention.

Fig. 7 is a fragmentary section on an enlarged scale taken on the line 7—7 of Fig. 14.

Fig. 7ª is an isometric view of the magazine slide locking bolt.

Figure 8:
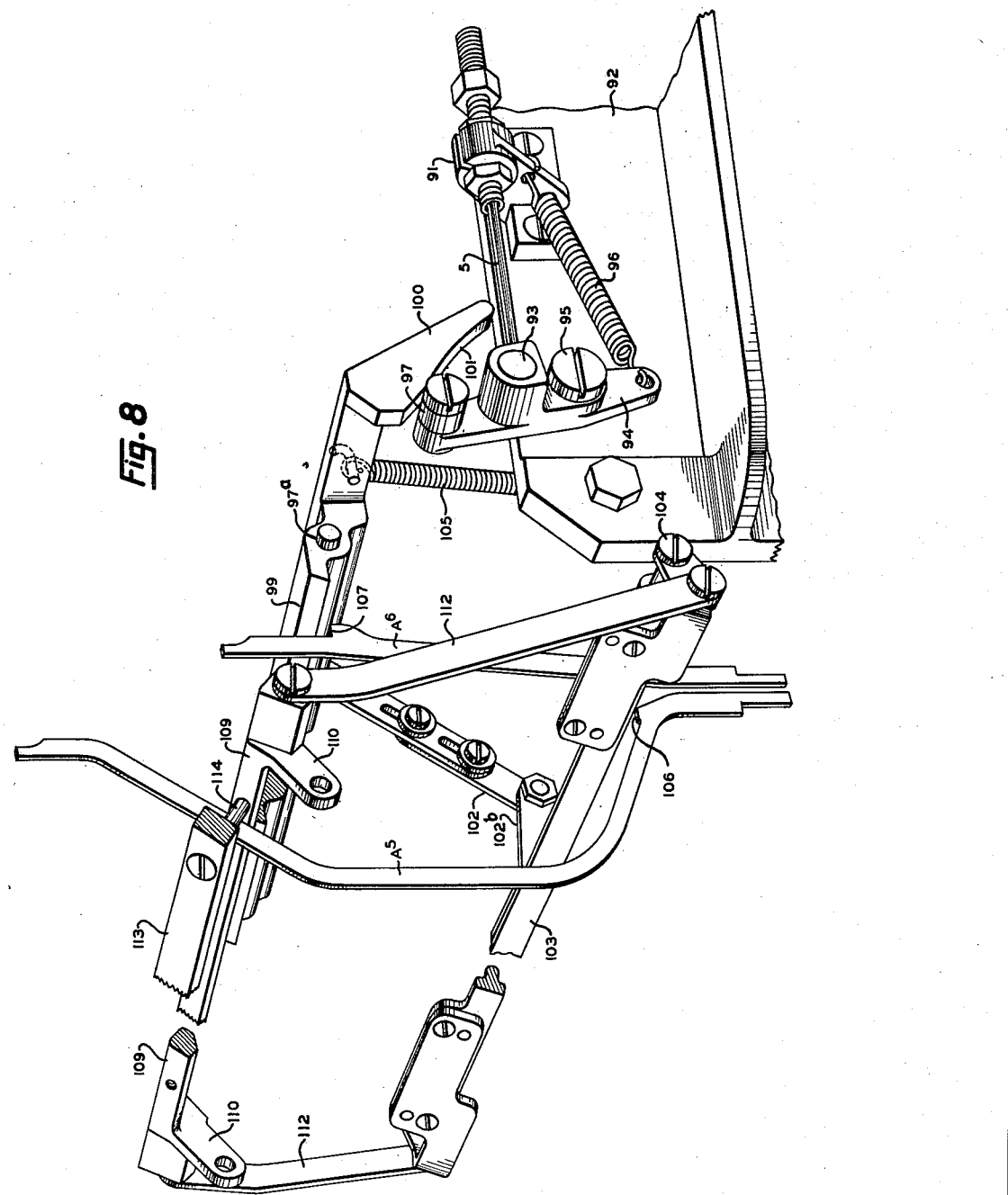

Fig. 8 is a perspective view of the keyboard reed depressors and matrix detecting safety devices of the invention.

Fig. 9 is a side elevation showing the devices in Fig. 8 as applied to associated parts of the machine and in inactive position.

Fig. 10 is similar to Fig. 9 with parts of the mechanism shown in section and in active or operated position.

Fig. 11 is a fragmentary view, partly in section and showing a displaced matrix caught by the matrix detecting bar.

Figure 12:
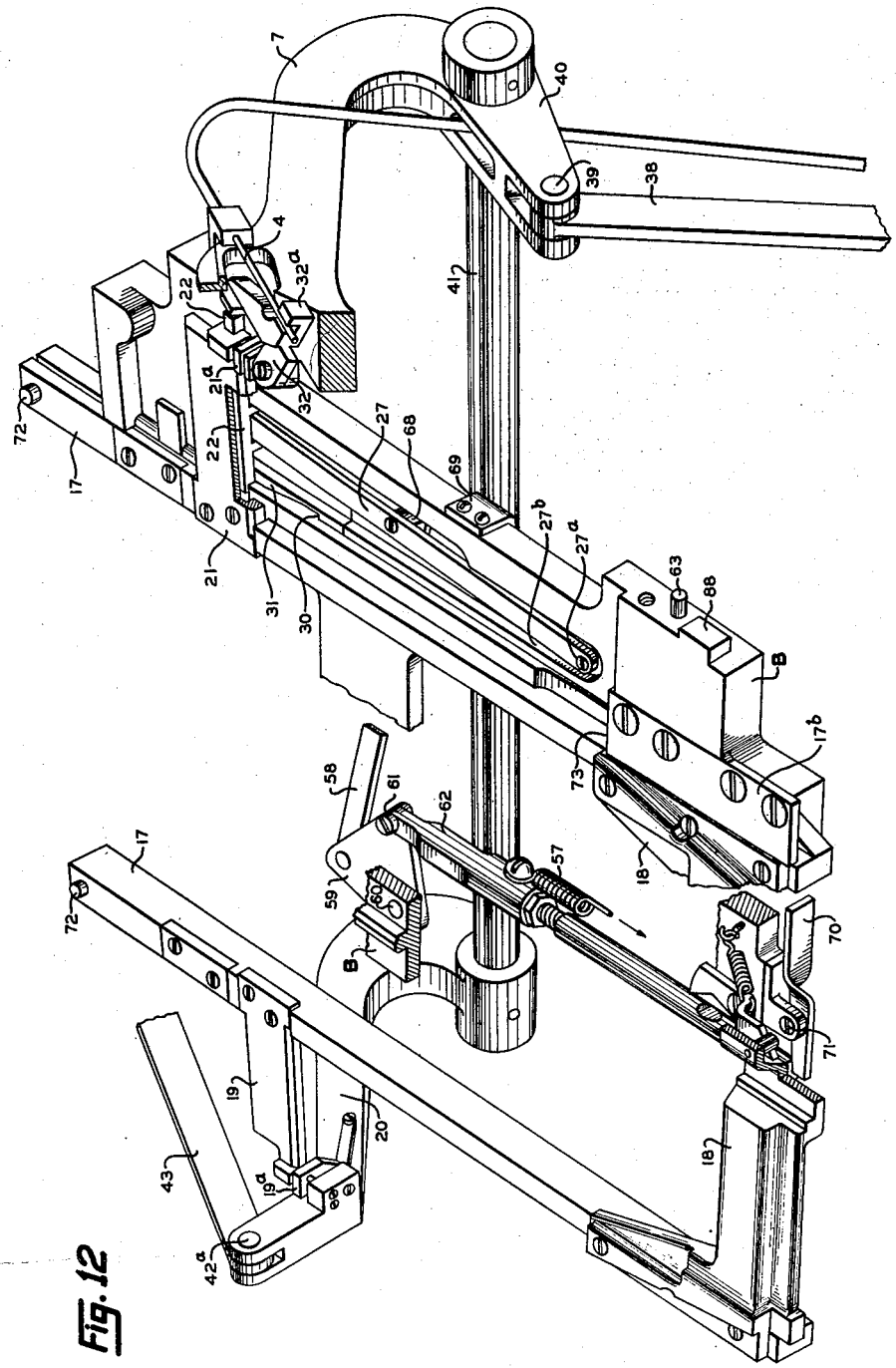

Fig. 12 is a perspective view of a portion of a magazine supporting frame with a sliding magazine removal frame arranged therein and shows the removal frame locked in retracted position ready for a shifting operation.

Fig. 13 is a fragmentary plan view of the parts at the right side of Fig. 12 with the magazine removal frame locked in forward or normal operating position.

Fig. 14 is similar to Fig. 13 but with the removal frame retracted and unlocked subsequent to completion of a shifting operation ready to be dropped to the forward position shown in Fig. 13.

Fig. 15 is a fragmentary plan view of the removal frame locking bolt and associated safety switch operating pin.

Fig. 16 is an inside elevation, partly in section, of the control switch for the magazine selecting and power shifting mechanism.

Fig. 17 is a sectional view taken on the line 17—17 of the control switch shown in Fig. 16.

Fig. 18 is a front elevation showing the control switch applied to the frame of the machine.

Fig. 19 is a front sectional view on line 19—19 of Fig. 1 showing the driving mechanism as applied to the magazine shifting shaft.

Fig. 20 is an electric circuit diagram showing the connections to the driving motor, control switch and several safety switches.

Fig. 21 is an electric circuit diagram showing the connections as applied to the modified control switch of the invention.

Fig. 22 is a side elevation similar to Fig. 1 showing the invention applied to a machine in which eccentric motion of the magazine unit is accomplished by cams and shows the modified control switch for the power driving mechanism.

Fig. 22ª is a fragmentary plan view partly in section showing details of a cut-off safety switch associated with the control switch lever of Fig. 22.

Fig. 23 is a front sectional view taken generally on line 23—23 of Fig. 22 showing the driving mechanism as applied to the magazine shifting shaft of the machine illustrated in Fig. 22, the shifting shaft for convenience being transposed to the foremost position as shown by dot-dash lines.

Fig. 24 is a side elevation of the modified control switch as shown in Fig. 22 but with the camming element thereof removed.

Fig. 25 shows the modified control switch of Fig. 24 as viewed from the opposite side or from the rear in Fig. 22 with the rear cover removed.

Fig. 26 is a section taken generally on line 26—26 of Fig. 24 and shows the elements of the modified control switch in normal position with all electrical contacts open.

Fig. 27 is a section taken generally on the line 26—26 of Fig. 24 but with the camming element shifted to the right and shows one set of contacts actuated thereby in closed position.

Figure 28:
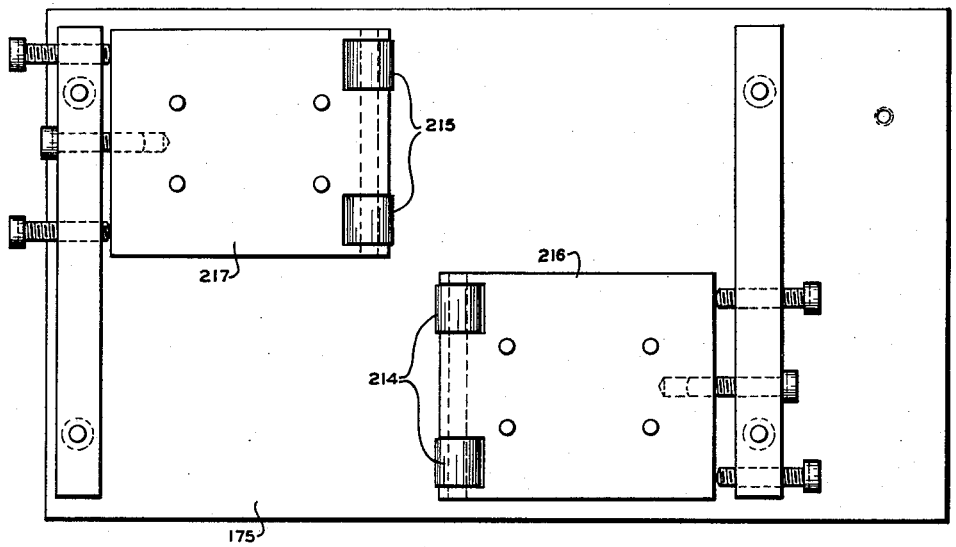

Fig. 28 is a plan view of the inner side of the camming element of the modified control switch illustrating the offset relation of the cam blocks.

Figure 29:
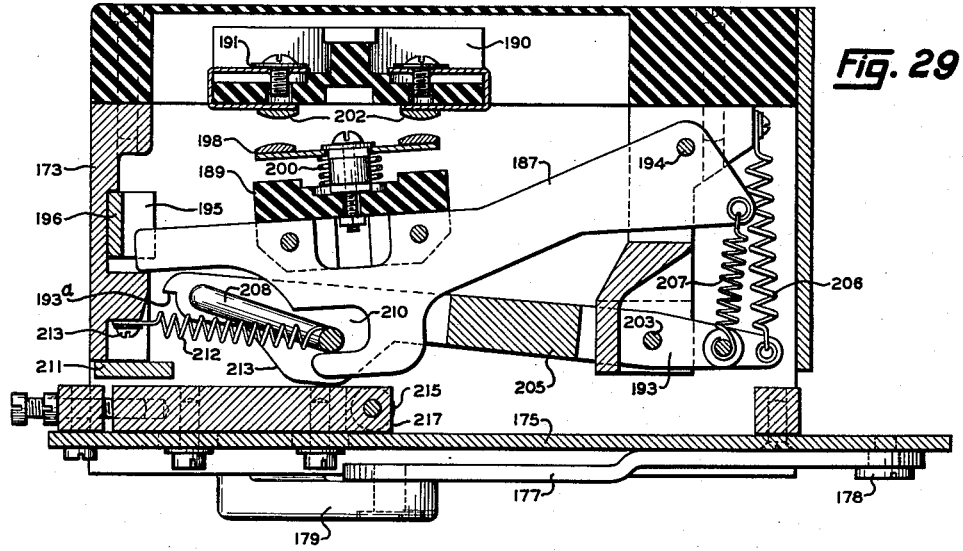

Fig. 29 is a section taken generally on line 29—29 of Fig. 24 and shows the open position of one set of contacts when the other set thereof is closed as shown in Fig. 27.

Fig. 30 is an isometric view of the camming element illustrated in Fig. 28 with the two contact actuating elements superposed thereon.

Similar parts are designated by the same reference characters in the several figures.

The power drive and controls of the present invention are applicable to machines of the class referred to having three or more superposed removable magazines constituting a unit or stack which is shiftable fore and aft in order to present any one or any pair of magazines in operative relation with the usual matrix assembling and distributing devices. The invention may be adapted to a main or an auxiliary magazine unit or to both such units of mixer or non-mixer machines, it being understood that whether the machine is a mixer or non-mixer simply depends upon the nature of the matrix distributing devices. The machine in the present instance is equipped with four magazines A, any pair of which may be brought into operative relation with the double assembling and distributing devices shown. Each magazine contains a font of matrices, the lower ends of the magazines being provided with escapements $A^1$ for releasing the matrices therefrom in response to manipulation of keys $A^2$ of the keyboard $A^3$ which operate reeds $A^4$ extending upwardly therefrom to upper cooperating sets of reeds $A^5$ and $A^6$ reaching to the escapements $A^1$. Each magazine is removably supported on a base frame B provided with a sliding removal carriage, the several frames being rigidly connected together and shiftable as a unit between a pair of side plates C secured to the usual distributor bracket D. For details of such construction and the manner of removing the magazine reference may be had to the above cited Freund Patent No. 1,988,417. The machine of course is also provided with the well known devices, not shown, for driving the machine proper (the main cams and the intermediate shaft), but it is deemed sufficient here merely to state that the power drive of the present invention is entirely independent of these devices.

As will be seen in Figs. 1 and 2, the magazines are stacked flatwise and inclined forwardly with the ends thereof in uniform stepped relation except for the pair of magazines which for the time being stand in operative relation with the assembler throats E. In the case of the active pair of magazines the escapement actuating reeds (upper sets of reeds $A^5$ and $A^6$ which cooperate with the keyboard connecting reeds $A^4$) extend beyond or inside the common plane of the ends of these magazines in order to reach the escapements. With this particular arrangement the magazine unit cannot be shifted in a lineal path due to the obstructing reeds $A^5$ and $A^6$ and in order to clear these reeds the lower end of the magazine unit is raised and lowered as well as translated bodily as it is shifted. To accomplish this, the portion of the shifting shaft which supports the lower end of the unit may be offset or eccentric with respect to the ends of the shaft which move in a lineal path along the toothed racks at each side of the machine frame as shown in Patent No. 1,650,552 above referred to and as later described in connection with Fig. 19 herein. In another arrangement shown in Patent 2,103,980 hereinabove referred to and described herein in connection with Fig. 22, the lower end of the magazine unit travels on cam tracks or blocks which raise and lower it during the shifting movement. In both of these constructions it is necessary also that the lower magazine of any pair in operative position be retracted prior to the shifting operation so that at such time all of the magazines stand in equally offset or stepped relation. Further, it is necessary that the usual channel entrance F be opened prior to a shifting operation.

*Magazine retraction—Channel entrance operation*

Retraction of the lower magazine of an active pair (Figs. 1 to 7 and 22) and opening of the channel entrance F is accomplished manually by a lever 1 pivotally mounted on a fixed stud 2 in the machine frame and having pivoted thereon near its handle at the front end a finger trigger 3 to which is connected a pair of Bowden wires 4 and 5. Upon squeezing trigger 3 the lever 1 can be depressed to the dot-dash line position indicated in Fig. 2 to thereby retract the lower magazine of a pair thereof and to swing into open position the channel entrance F. As may be seen in Figs. 2 and 8, Bowden wire 5 is cooperative with certain safety devices which prevent squeezing of trigger 3 in the event that obstructions such as reeds or protruding matrices lie in the path of movement of the lower ends of the magazines. These safeties will be described later under the heading "Mechanical safety devices."

As may be seen in Figs. 1, 3, 4, 5, 12 and 14 Bowden wire 4 is cooperative with the magazine retracting and channel entrance operating and locking mechanisms. Assuming that the path of movement of the lower ends of the magazines is clear as determined by operation of the safeties in connection with Bowden wire 5, trigger 3 can be squeezed to its full extent and Bowden wire 4 will then be drawn to the right as viewed in Fig. 5, thereby causing connected plunger 6 and sleeve $6^a$ fixed thereto by a pin, to move to the right in guides $7^a$ in the magazine retracting lever 7 against the action of compression spring 8. As sleeve $6^a$ moves to the right, roller 9 mounted on screw stud $9^a$ therein and guided in a slot 10 in the lever 7 rocks cam 11 (Fig. 3) clockwise about its pivot $11^a$ in bracket $11^b$ secured to the distributor bracket D. Adjustable link 12 pivotally connected to cam 11 is thus drawn downwardly thereby rocking the lever 13 pivoted at $13^a$ to the distributor bracket D and loosely connected at $13^b$ to link 12. Roller $13^c$ mounted on the free end of lever 13 is thus lifted by link 12 against the tension spring $13^d$ and forces the channel entrance locking pawl 14 pivoted on the frame of the entrance F out of engagement with the lug $13^e$ on keeper 15 which is secured to the distributor bracket D. The lever 13 normally rests at its free end against a stop arm 16 and when rocked as described due to squeezing the finger trigger 3 on lever 1 the channel entrance is unlocked and free to swing open in the usual manner, it being pivotally mounted on studs in the machine frame and limited in its swinging movement by stops. The connections which operate the channel entrance in its movements to open and closed positions respectively before and after a magazine shifting operation will be herein described after dealing next with the magazine retracting mechanism which is also operated by the Bowden wire 4 and lever 1.

Referring to Figs. 2, 7, 12, 13 and 14, the magazines A are supported on base frames B each having slidably arranged therein a magazine removal carriage or frame comprising a pair of longitudinal side members 17 slidable in grooves 17a (Fig. 7) and connected together at their forward ends by a cross member 18, and a pair of laterally projecting hangers 19 and 21, one being fixed to each slide member 17 and adapted to be engaged by the magazine retracting levers 20 and 7 respectively. The side members 17 of the sliding frames are retained in grooves 17a by plates 17b, the construction being generally similar to that disclosed in Patent No. 1,988,417 to which reference has already been made. Into a groove 21a in the underside of hanger 21 and extending transversely of the adjacent side member 17 is fitted a slidable locking bolt 22 having three downwardly extending lugs or projections 23, 24, 25 and being retained in groove 21b by engagement with the upper surface 26 (Fig. 7) of base frame B. The projections 23 and 24 straddle a lever 27 pivotally mounted at 27a in a recess 27b in frame B, and lug 25 cooperates with a slot 28 in the right hand side member 17 (Fig. 6) as well as either of two frame positioning steps 29 or 30 of a latch plate 31 imbedded in frame B. In Fig. 13 the lower magazine of a pair (lowermost magazine A in Fig. 2) is shown in forward position wherein its lower end lies in the same plane as the corresponding end of the magazine above it and stands in operative relation with the lower throat of the assembler front E. The sliding frame or carriage on which this lower magazine rests is locked in such position by engagement of lug 25 on bolt 22 with slot 28 in side member 17 and at the same time with step 30 on plate 31.

As already explained, operation of finger trigger 3 pulls Bowden wire 4 and plunger 6 connected thereto to the right (Fig. 5) to unlock the channel entrance. Simultaneously the right hand end of plunger 6 acts on arm 32a of bell crank 32 which is pivoted at 32b on the magazine retracting lever 7 and normally urged against the end of plunger 6 by spring 32c. Bell crank 32 is thus rocked counterclockwise with the result that its other arm 32d engages the right hand end of locking bolt 22 and slides the latter leftward into slot 28 to the position shown in Figs. 6 and 14. It will be understood that bolt 22 occupies this leftward position whenever acted upon by bell crank 32, that is, when actuated by the bell crank to disengage it from step 30 prior to retracting the sliding magazine frame (members 17 and cross member 18) from its forward or operating position in Fig. 13 and when actuated to disengage it from step 29 to permit the sliding frame to be moved forwardly from retracted position, Figs. 6 and 14, upon completion of a magazine shifting operation.

A further operation resulting from pull of Bowden wire 4 by finger trigger 3 is the release of a safety device for preventing movement of the sliding magazine carriage or frame unless finger trigger 3 is squeezed to the required extent for fully releasing the channel entrance locking lever 13 and bolt 22. Thus, pull of Bowden wire 4 results in the rocking in a counterclockwise direction of a bell-crank lever 33 (Figs. 3 and 14) which is pivoted at 33a in lever 7. One arm of bell crank 33 engages in a recess 34 cut horizontally across the sleeve 6a (Figs. 3 and 5) and the other arm is provided at its extremity with a stud 35 adapted to travel in a box cam 36 formed in a fixed bracket 36a secured to the machine frame. When plunger 6 is moved to the right by the pull of Bowden wire 4 and bell crank 33 is rocked as stated, stud 35 swings upwardly out of the depression 37 at the left end of box cam 36, thus enabling the stud 35 to ride in the longitudinal slot of the cam during the retracting movement of the sliding magazine frame.

Having released the channel entrance lock 13, the safety stud 35, and locking bolt 22 by squeezing finger trigger 3, lever 1 is now free to be swung downward manually and it will be seen that the squeezing action on trigger 3 need not be continued after stud 35 of bell crank lever 33 enters the longitudinal portion of the box cam 36.

Upon depression of lever 1 pivoted at 2 the short arm 1a of the lever swings in a counterclockwise direction against tension of spring 1b thereby forcing vertical link 38 connected thereto upwardly. The upper end of link 38 is loosely connected at 39 to the short arm 40 of the magazine retracting lever 7, the latter being pinned to one end of a cross shaft 41 to which at the other end is pinned the complementary magazine retracting lever 20, see Fig. 12. The shaft 41 is suitably journaled in bearings located toward the rear portion of side plates C of the machine frame. Loosely connected at 42 and 42a to levers 7 and 20 respectively are links 43 each having similarly shaped slots 44 formed therein toward their free ends. In notches 45 at the forward ends of slots 44 there engages pins 46 (Figs. 3 and 4), one pin in each of a pair of links 47 located respectively at the left and right hand sides or ends of the channel entrance frame F. Links 47 are pivoted at 48 to rigid side frame members 49 and are loosely connected at 50 to links 51 pivoted at 52 to the channel entrance frame F.

When lever 1 is depressed shaft 41 is turned clockwise through the medium of links 38, lever 7 and 20 thus being rocked clockwise and swinging links 47 connected thereto by links 43 about their pivots 48 due to engagement of pins 46 in notches 45. Through links 51 connected to links 47 and to the channel entrance frame F the latter is forced to swing backwardly first about the bearings 53 and finally about the bearings 54 which support the frame pivotally on the rigid side frame members 49 of the machine through the medium of levers 55. These actions are best seen in Figs. 3 and 4 which respectively show the channel entrance in closed and open positions.

Simultaneous with this opening movement of the channel entrance levers 7 and 20 act upon the hangers 21 and 19 respectively to retract the sliding magazine frame of the lower of two magazines in use from the position shown in Fig. 13 to the position shown in Figs. 6, 12 and 14, stud 35 on bell crank 33 traveling in box cam 36 until it drops into depression 56 (Figs. 3 and 14) thus locking lever 7 and the train of link connections therefrom to the channel entrance in position for retaining the entrance in open position. When stud 35 drops into depression 56 bell crank 33 swings counterclockwise. This permits plunger 6 to recede to the left under the influence of spring 8 (Fig. 5) and allows bell crank 32 to swing clockwise under pull of spring 32ᶜ whereby the arm 32ᵈ of bell crank 32 loses its contact with the outer end of bolt 22. Thus, upon full retraction of the sliding magazine frame, as above described, bolt 22 is left under the influence of spring 57, it being seen from Fig. 12 that lever 27 which is straddled by lugs 23 and 24 on bolt 22 and pivoted at 27ᵃ is connected to a link 58 which in turn is connected to a plate 59 pivoted at 60 to the main magazine support frame B and having connected thereto at 61 a rod 62 to which is secured one end of spring 57, the other end of said spring being secured to a cross member (not shown) of the magazine support frame B. Accordingly, as soon as the sliding magazine frame and the magazine carried thereby is fully retracted bolt 22 is moved, by action of spring 57, to the right from the position shown in Figs. 6 and 14 to a position corresponding to that shown in Fig. 13 except for the fact that lug 25 on bolt 22 now moves into engagement with the upper step 29 on latch plate 31. In such position bolt 22 retains the sliding magazine frame positively in retracted position during the shifting of the magazine unit which operation will be described later on under the heading "Power shift and electrical controls."

As will be seen from Figs. 3 and 4 the free rear ends of links 43 may be lifted by hand to disengage pins 46 from notches 45 thereby enabling the manual opening of channel entrance F for inspection or any other reason. Levers 7 and 20, it may be stated, act on hangers 21 and 19 through adjustable blocks 21ᵃ and 19ᵃ suitably secured to projections on the levers (see Figs. 5 and 12).

After the desired magazine shift has been made, in a manner to be described later as above stated, the lowermost magazine of the newly selected pair thereof must be slid forwardly into operating relation with assembler entrance E, and the channel entrance F must be returned to closed or operating position. This is accomplished by again squeezing finger trigger 3 and then pulling lever 1 upwardly. Upon squeezing trigger 3 Bowden wire 4 again pulls plunger 6 to the right and bell crank 32 then acts on bolt 22 to press the latter to the left against the tension of spring 57, lug 25 receding into slot 28 as it leaves step 29 (Fig. 6) and stud 35 leaving depression 56 in box cam 36 due to counterclockwise movement of bell crank 33 by plunger 6. Lever 1 may now be pulled upwardly without continuing the squeezing action on finger trigger 3 whereby shaft 41 and levers 7 and 20 secured thereto will be turned counterclockwise. Links 43 now exert a forward pull on links 47 and 51 whereby the channel entrance frame F is caused to swing from open position, Fig. 4 to closed position, Fig. 3 whereupon locking pawl 14 engages over lug 13ᵉ to lock the entrance closed. Meanwhile, recession of bolt 22 from step 29 leaves the sliding magazine frame and the magazine thereon (the frame of the newly selected magazine of a pair thereof) free to slide forwardly, the pull of spring 1ᵃ together with the weight and forward incline of the frame and magazine easing the load on lever 1. Action of spring 57 transmitted to bolt 22 after release of the finger trigger 3 as soon as upward pull on lever 1 is started urges lug 25 on the bolt against the inclined face of plate 31 so that the forward movement of the sliding frame is stopped as soon as lug 25 engages step 30 on plate 31. By this time stud 35 traveling in box cam 36 enters the forward depression 37 whereby plunger 6 recedes as far as it can under the influence of spring 8.

As a safety measure to prevent shifting of the magazine unit by the power shift mechanism, yet to be described, in the event that bolt 22 should not slide back into full engagement with upper step 29 after the bolt has been actuated due to squeezing of trigger 3 (gummy conditions, wear of parts, burrs or breakage of spring 57 may cause failure of bolt 22 to function properly), there is provided a safety locking bolt 63, Figs. 12, 13, 14 and 15. A bolt 63 is provided in each of the three lower magazine supporting frames B, the bolts being slidable in lateral bores 63ᵃ located toward the front right hand end of the frames. Bolt 63 is provided toward the inner end thereof, accessible in a cored opening 63ᵇ in frame B, with an annular groove 64 adapted to accommodate the forked lower end of a lever 65 which is also forked at its upper end where it straddles a stud 66 secured in lever 27 (see also Figs. 7 and 15), stud 66 projecting downwardly through an opening 67 cut through frame B. Lever 65 is pivoted on a stud 68 carried by a block 69 secured to frame B, stud 68 being located below the stud 66 in lever 27. Thus, when lever 27 swings counterclockwise due to actuation of bolt 22, lever 65 is compelled to swing in the same direction. In Fig. 14 bolt 22 has been actuated to the left by bell crank 32 with the result that levers 27 and 65 have been swung counterclockwise about the respective pivots 27ᵃ and 68, thus sliding bolt 63 to the right where it projects beyond the edge of plate B' and engages in a bushing 69 in the fixed frame member C of the machine and thereby locks the magazine unit against any movement such as would be imparted thereto by the power shifting mechanism. Bolt 63 assumes this locking position whenever bolt 22 is actuated to the left and remains in such position unless and until bolt 22 returns to the right into full engagement with step 29 or 31. Thus, upon actuation of bolt 22 from the position shown in Fig. 13 to that shown in Fig. 14, the magazine unit is locked against shifting movement until trigger 3 is fully released, a condition which cannot prevail until lever 1 is fully depressed so that stud 35 enters depression 56 in box cam 36 as already explained.

It may be pointed out that the sliding magazine frames referred to enable the sliding forwardly out of the stack of magazines any magazine it is desired to replace by one containing a different font of matrices, this being the subject of Letters Patent No. 1,988,417 previously referred to. In order to release bolt 22 from the lower step 30 on plate 31 when it is desired to slide a magazine out forwardly there is provided a finger lever 70, Fig. 12, pivoted at 71 to cross member 18, the free end of this lever being adapted to act on rod 62 and push the latter rearwardly, thereby rocking plate 59 counterclockwise. Link 58 connected to plate 59 and to lever 27 swings the latter counterclockwise with the result that bolt 22 is forced leftward out of engagement with step 30 and the sliding frame is then free to withdraw forwardly until stopped by pins 72 on side members 17, these pins engaging the upper edges 73 of plates 17ᵇ when the frame is all the way forward.

*Eccentric motion of magazine unit*

As already stated, the invention is herein illustrated as applied to machines in which the lower end of the magazine unit travels in an eccentric path as the unit is translated bodily fore and aft in the supporting framework of the machine, such eccentric movement being necessary in order to clear the escapement actuating reeds which reach inside the plane of the lower ends of the active pair of magazines. Thus, as disclosed in Letters Patent No. 1,650,552 to which reference has already been made, and referring to Figs. 1, 2 and 19, the magazine unit is rockably mounted about midway of its length on an upper transverse shaft 74 carried in bearings in the lowermost magazine frame of the unit, the shaft being supported by rollers 75 on track 76 formed on the rigid main frame members C at each side of the machine. Toward its lower end the magazine unit (underside of the lowermost magazine frame B) rests freely but intermittently on rollers 77, one near each end of a cross shaft 78 the opposite ends of which shaft are secured in cranks 79, one shown in Fig. 19. Offset relative to shaft 78 and secured in each crank 79 is a laterally extending stub shaft 80 provided with a roller 81 which runs on a track 82 in each side frame members C and extends parallel to the upper tracks 76. Each stub shaft has keyed thereon a pinion gear 83 which travels on a toothed rack 84 parallel to tracks 76 and 82 and secured to frame member C. Each stub shaft 80 also has eccentrically mounted thereon a bushing 85 adapted to turn fully in the hub at the lower end of a bent link 86 connected at its upper end to cross shaft 74. Rollers 75 bank against set screws 87 in upstanding lugs on frame C when the magazine unit is in its rearmost position as shown in Fig. 1. Normally the lower end of the magazine unit is supported by lugs 88, Figs. 1 and 12, which project laterally from each side of each magazine supporting frame, the lugs on the frame of the upper of two active magazines engaging in a notch 89 in a plate 90 secured to the inside face of each side frame member C.

When stub shaft 80, or any convenient extension thereof such as the crank handle in Patent No. 1,650,552, above referred to, is rotated, pinion gears 83 traveling along toothed racks 84 transmit movement to bent links 86 and upper shaft 41 to which these links are connected, thus bodily moving the magazine unit fore or aft in the machine frame according to the direction of rotation of the stub shaft. Concurrently with rotation of the stub shaft, cranks 79 swing shaft 78 in a circle concentric with the center of rotation of the stub shafts 80 whereby rollers 77 on shaft 78 contact with flat portions 77a (see Fig. 2) formed on the underside of the lowermost magazine frame B immediately above the rollers 77. Thus, the lower end of the magazine unit is raised and then lowered once during each full turn of the stub shafts 80. Such motion of the lower end of the unit during its travel forwardly enables the forward end of the under magazine of a pair thereof being shifted out of active position to rise over and clear the upper ends of the reeds A⁵, it being seen in Fig. 2 that when the under magazine of an active pair is retracted to the position X represented by dotted lines, as it is just prior to a shifting operation, it will clear the upper ends of reeds A⁵ if moved along the arcuate path represented by the dot-dash line Y. It should be pointed out here that in Fig. 2 the magazine unit is shifted as far forwardly as it can be shifted and the above discussion of the path of movement of the under magazine of an active pair during rotation of shafts 80 is made in respect to Fig. 2 only for purposes of illustration and convenience. Should the magazine unit be shifted rearwardly the forward end of the upper magazine of an active pair would travel in a similar arcuate path Y due to the unit being raised and lowered by the shaft 78 offset as it is in cranks 79, thus clearing the upper ends of reeds A⁵.

From the foregoing it will be seen that rotation of stub shaft 80 (shafts 80, pinions 83, cranks 79 and shaft 78 as a whole) transmits bodily fore or aft movement to the magazine unit through links 86, rollers 81 traveling on tracks 82 and rollers 75 on the upper tracks 76. The eccentrically mounted bushings on stub shafts 80 have the purpose of accelerating the fore or aft movement of the magazine unit after its lower end has been raised sufficiently by the offset shaft 78 to clear the reeds A⁵ or A⁶ as the case may be, the radial disposition of the bushings being such that fore or aft movement of the unit is retarded toward the beginning and end of each rotation of stub shafts 80.

Mechanical safety devices

As set forth hereinabove, Bowden wire 5 connected to finger trigger 3 is cooperative with certain safety devices which prevent the squeezing of said trigger in the event that obstructions such as reeds or protruding matrices lie in the path of movement of the magazine unit and such safety devices are particularly concerned with detecting the presence of obstructions which may occasionally lie in the path of movement of the lower ends of the magazines and if struck during shifting of the magazine unit under power may cause a serious jam and result in damage to the conflicting parts.

Referring to Figs. 1, 2, 8, 9, 10 and 11, Bowden wire 5 passes through a bearing block 91 secured to the rigid tie bracket 92 of the machine frame, the end of the wire being secured in a lug 93 on a two armed lever 94 which is pivoted at 95 to bracket 92, one arm of lever 94 being connected to a spring 96 secured at its opposite end to block 91 and the other arm of lever 94 being provided with a roller 97. On the stub shafts 97a pivoted at opposite ends in the fixed reed frame 98 is provided a reed depressor bar 99 having a cam shaped arm 100 at the right hand end, the cam surface 101 of which overlies roller 97 on lever 94. By means of an adjustable link 102, a lateral arm 102a of bar 99 is loosely connected to a lateral arm 102b of a second reed depressor bar 103 pivoted at 104 in the opposite end members of the frame 98. When lever 94 is turned clockwise due to pull on Bowden wire 5 when trigger 3 is squeezed, roller 97 acting on cam surface 101 rocks in a counterclockwise direction the depressor bar 99 and also bar 103 connected thereto by link 102, against the tension of spring 105. In common horizontal alignment on all of the reeds A⁵ are flat surfaces 106 and likewise all of the reeds A⁶ are provided with flat surfaces 106 and likewise all of the reeds A⁶ are provided with flat surfaces 107, the surfaces 106 and 107 being located respectively in the path of the depressor bars 103 and 99. Thus, should any of the reeds A⁵ or A⁶ fail to drop vertically by gravity as they are intended to do after being raised by a corresponding keyboard reed A⁴ to actuate an escapement A¹, depressor bars 103 and 99, when rocked as described will engage surfaces 106 and 107 and force the offending reed or reeds downwardly to their proper seated position against the guide bars 108 on the frame 98. Figs. 9 and 10 respectively show the position of the depressor bars 103 and 99 and associated parts before and after squeezing of trigger 3. This depression of reeds occurs when trigger 3 is squeezed and thus assures that the upper ends of all of the reeds lie out of the hereinabove described arcuate path Y, Fig. 2, of shifting movement of the lower ends of the magazines A prior to a shifting operation.

A further mechanical safety comprises a matrix detector bar 109 having lateral arms 110 pivoted at 111 in the opposite end members of frame 98 and loosely connected by links 112 to the opposite ends of depressor bar 103. When the bars 103 and 99 are rocked counterclockwise by squeezing trigger 3, the matrix detector bar 109, through its connecting links 112, is rocked clockwise whereby it swings across the mouth of the lower magazine A of an active pair of magazines. Should a matrix M, Fig. 11, inadvertently stick in a position similar to that illustrated where it protrudes from the mouth of the magazine, it would conflict with reeds or other parts if not removed in advance of shifting the magazine unit and result in damage of one kind or another to moving parts of the machine. Thus, if the full swing of detector bar 109 across the mouth of the magazine is obstructed by a protruding matrix as illustrated in Fig. 11, trigger 3 cannot be squeezed to its full extent and consequently other devices operated by squeezing of the trigger and by depression of lever 1 cannot be actuated to the extent necessary to perform their functions. Such condition having been detected, the operator may remove the offending matrix whereupon normal operation of parts and devices in connection with Bowden wires 4 and 5 will follow. Detector bar 109 is provided with a stiffening rod 113 secured to the bar by studs 114 and having the purpose of preventing bar 109 from bowing or springing in the event that the protruding matrix happens to be located remote from the pivoted ends of the bar. This matrix detector safety is provided only for the lower magazine of an active pair, it being evident that a matrix which may protrude from the mouth of the upper magazine will be easily visible to the operator.

*Power drive magazine shift*

Stub shaft 80 at the right side of the machine, Figure 19, is provided with a shouldered extension 115 pinned to shaft 80 and having secured on the reduced section thereof a spur gear 116, the pitch diameter of which is greater than that of pinion 83. Extension shaft 115 also has secured thereon a worm gear 117 with a collar 117a and adapted to engage a threaded spindle 118 rotatably journaled in brackets 118a and 119 secured respectively to the frame member C and distributor bracket D, Fig. 1, the axis of spindle 118 extending parallel to the aforementioned tracks 76 and 82 on which the magazine unit travels when shifted. The rear end of spindle 118 is connected by a coupling 120 to the driving shaft 121 of a reversible speed reduction motor 122 mounted on a bracket 123 secured to distributor bracket D. In a slotted guideway 124 formed in a downward extension of bracket 119 and a similar guideway formed in a bracket 125 there is provided a floating rack bar 126 having teeth 127 along its upper edge engageable with spur gear 116 on extension shaft 115 and also having teeth 128 along a portion of its lower edge engageable with a gear segment constituting part of an element 129 of the control switch device of the present invention and described herein under the heading "Control switch." Rack bar 126, like spindle 118 extends parallel to the magazine supporting tracks 76 and 82 and this bar is movable fore and aft in its guides in accordance with the direction of rotation of shaft 115.

It is to be observed here that since the pitch diameter of spur gear 116 is greater than that of pinion 83 rotation of shaft 80 and gear 116 fixed to the extension 115 thereof, which results in moving the entire magazine unit due to the travel of pinions 83 along the stationary toothed racks 82 on each side frame member C, imparts differential movement to rack bar 126. Thus, in conjunction with the control switch next to be described, rack bar 126 which is moved at a greater rate than that of the magazine unit provides automatic means for cutting off the power drive when a selected magazine arrives in operating position, said bar stopping at a different longitudinal setting for each magazine position as determined by its action on the aforesaid control switch.

*Control switch*

For controlling the power drive for shifting the magazine unit bodily either forwardly or rearwardly in the machine, or more specifically, for starting the driving motor 122 regardless of which magazine happens to be in operating position at the time and for stopping the motor regardless of the extent of movement of the unit that may be required to bring a desired magazine into operating position, there is provided according to the invention a manually settable magazine selecting lever 130 formed on an element 131 which is cooperable with the element 129 previously referred to, these elements together constituting a control switch for governing the operation of the power drive. These switch elements are best illustrated in Figs. 16 and 17 and also shown in Figs. 1 and 18. Element 129 is rotatably mounted on the outer face of hub 132 formed on element 131 and bears flatwise against the circular surface 133 of element 131, the latter element being provided with a bore 134 for mounting it rotatably on a stub shaft 135 provided in a downward extension of bracket 125. Suitably secured to element 131 is a block 136 of insulating material (any commercial non-conductor of electricity such as fibre, celeron or the like) having formed therein one above the other two bores 137 and 138 containing spring pressed carbon brushes 139 and 140 respectively.

Switch element 129 is provided about centrally of its arc shaped wing 129a with a vertically disposed insulating member 141. At opposite sides of member 141 there is secured as by rivets to element 129, one above the other and separated from one another in each instance by insulation 141a, pairs of conducting segments 142, 143 and 144, 145 respectively. The pairs of segments 142, 143 and 144, 145 respectively are also suitably insulated from element 129 as by insulation 141b. The outer edges of conducting segments 142, 143 and 144, 145 are formed on a radius generated about hub 132 and form arc 129a which conforms to arc 131a on element 131 which is also concentric with hub 132. From the foregoing it will be evident that the switch device as described is basically the equivalent of a double pole double throw switch and that obviously additional brushes and insulated layers of conducting segments could readily be supplied to accommodate more complex electrical circuits or circuits suitable for multi-phase motors without departing from the spirit of the present invention insofar as concerns the function of the switch device as hereinafter explained.

It will be recalled that switch elements 129 and 131 are both rotatably mounted on stud 135, Fig. 1, and that element 131 is provided with a manually settable magazine selecting lever 130. For selecting a desired magazine lever 130 may be set in any one of three positions, it being remembered that in the present instance there are four magazines A, any adjacent pair of which may be shifted into operative relation with the matrix assembling and distributing devices of the machine. Thus, bracket 125 is provided with an extension arm 146 at the front end of which is provided a plate 147 having formed therein three notches 148 each corresponding to a different position of the magazine unit. Lever 130 is provided with a spring pressed detent 149 adapted to register the lever in one or another of the notches 148 according to which magazine or pair thereof is selected. The arrangement of the control switch elements is such that the insulating member 141 in element 129 normally lies opposite to the brushes 139, 140 so that no current can pass between the switch elements 129 and 131. However, radial displacement of element 131 relative to element 129 will set brushes 139, 140 opposite the live or conducting segments 142, 143 or 144, 145 (according to the direction of the displacement) and thus allow current to flow provided other electrical safety devices yet to be described do not keep the circuit open. Actual operation of the power shift mechanism in connection with the electrical circuits will be fully described herein under the heading "Power shift and electrical circuits." For the present it is sufficient to say that the operator of the machine may set lever 130 at any desired notch position, either adjacent to or remote from its previous setting and the magazine unit will immediately shift directly to the newly selected position, upwardly or downwardly in the machine, and without stopping at an intervening magazine location. As soon as the insulating member 141 assumes a position opposite to the brushes 139, 140 as it does due to movement of member 129 by rack bar 126 as the magazine unit moves, the power drive will immediately become inoperative, the selected magazine having then arrived in operating position.

*Electrical safety devices*

In connection with the mechanical safety locking bolt 63 hereinabove referred to there is secured to frame C an electrical safety switch generally designated 150 and having two yieldable contact arms 151, 152 insulated from each other. Contact arm 151, as best shown in Figs. 13 and 14 is provided at its free end with a plunger 153 made of insulating material such as fibre and adapted normally to extend through bushing 69 so that its free end lies adjacent to the free end of locking bolt 63 attached to lever 65. When lever 65 swings counterclockwise due to actuation of bolt 22 when trigger 3 is squeezed, bolt 63 forces insulated plunger 153 to the right, Fig. 14, thus opening the switch contacts 151, 152 whereby the electrical circuit for the motor 122 is broken. When trigger 3 is fully released (upon full depression of lever 1) and bolt 22 thus slides to the right, concurrent recession of bolt 63 will permit the yielding contact arm 151 and plunger 153 to return to normal position shown in Fig. 13 whereby the electrical circuit through the switch will be closed. Discussion of the electrical circuits involved in connection with switch 150 just described and with motor 122, the control switch and other electrical devices will be taken up under the succeeding heading, "Power shift and electrical circuits."

Referring to Figs. 1, 3 and 4 another safety switch 154 is provided for maintaining the electrical circuit for motor 122 open until lever 1 is fully depressed, this switch being suitably mounted on the distributor bracket D of the machine as shown. Switch 154 comprises yieldable contact arms, not shown, but similar to those of switch 150. Normally the contacts on the arms of switch 154 are separated so that the motor circuit is broken. Upon full depression of lever 1 the head of an adjustable screw 155 in a bracket 156 on link 38 presses plunger 157 on the lower horizontal contact arm of switch 154 upwardly, thus closing the electrical circuit through the switch.

*Power shift and electrical circuits*

Assuming that it is desired to shift the magazine unit bodily from the position shown in Fig. 1 where the upper pair of magazines are active to that shown in Fig. 2 where the lower pair of magazines are in operating position, the operator may follow either of two alternative procedures. He may first depress lever 2 to its full extent and then set the magazine selecting lever 130 or he may first set lever 130 and then depress lever 1. In any event the magazine shifting motor will not operate until lever 1 is fully depressed and unless lever 130 is shifted to a new position.

Following the first mentioned procedure, upon squeezing trigger 3 and depressing lever 2 the channel entrance F is unlocked and swung open, Fig. 3; the second magazine A from the top of the stack is retracted to the position shown in Fig. 14 where it is locked by bolt 22 engaging stop 29, and stud 35 is seated in depression 56. Assuming such full depression of lever 2 and recession of locking bolt 63, the motor circuit through switches 150 and 154 will be closed as already pointed out. It now remains to complete the motor circuit through the control switch elements 129 and 131. This is accomplished by shifting the magazine selecting lever 130 from its lowest position shown in Figs. 1 and 18 to its highest position where its detent registers with the upper notch 148. Such shifting of lever 130 results in radial displacement of switch element 131 to which the lever is connected, see Fig. 16, whereby insulating member 141 is shifted from its normal position overlying the brushes 139, 140 in switch element 129 and conducting segments 142, 143 on element 129 are brought into contacting relation with the brushes.

Referring to the circuit diagram, Fig. 20, it will now be seen that with the contacts of switches 150 and 154 closed and brushes 139, 140 in contact with segments 142, 143 current can flow through wire 158 to brush 139; through segment 142 and wire 159 to armature terminal $A^1$; from armature terminal $A^2$ over wires 160, 161 to segment 143, thence through brush 140 over wire 162 and through closed switches 150 and 154 to return wire 163. Wires 158 and 163 also feed the field windings of the motor, the former wire being connected to the field terminal $F^1$ by lead 164 and the latter wire 163 being connected to field terminal $F^2$ through a short lead 165 from wire 162.

Thus the motor and its driving connections are rendered operative to shift the magazine unit bodily along its upper and lower supporting tracks 76 and 82 respectively and such shifting movement will continue until the motor circuit is broken. It should be noted, however, that the driving mechanism as a whole remains constantly in coupled relation with the motor, that is, no mechanical clutching devices are employed. The motor circuit is broken and operation of the power drive is stopped automatically through the medium of the floating rack bar 126 which, it will be recalled, is moved by spur gear 116 at a slightly greater rate than the movement of the magazine unit by pinions 83 which are of less pitch diameter than the spur gear 116. When the magazine unit is moved forwardly, as presently assumed, the rack bar 126 moves rearwardly in its guides in brackets 119 and 125 due to counterclockwise rotation of gear 116 as the shifting shaft 80, 115 is turned by spindle 118 under power of the motor 122. Thus, switch element 129, by virtue of its toothed segment meshing with teeth 128 on the rack bar, is rotated clockwise until the insulating member 141 on element 129 again overlies the brushes 139, 140 whereupon the motor circuit immediately will be broken and shifting movement of the magazine unit will stop. From Fig. 20 it will be noted that the field circuit through the motor is not broken simultaneously with the current through the armature. Thus, the field windings function as an electro-magnetic brake to stop the motor quite abruptly which is a desirable feature from the standpoint of accurate and positive seating of the magazine locating lugs 88 on plates 90.

Upon automatic cutting-off of the power shift as just described trigger 3 is again squeezed in order to release lug 35 from the depression 56, actuate bolt 22 to release it from step 29 and thus permit the lower magazine of the newly selected pair to slide forwardly when lever 1 is raised to its normal position, the channel entrance at the same time being swung back to its normal closed position shown in Fig. 3.

To shift the magazine unit from the upper position to a lower position, lever 1 is depressed as before after squeezing trigger 3 and the magazine selecting lever 130 is then shifted to one of the lower notches 148. In such case the brushes on control switch element 131 will be moved into contact with conducting segments 144, 145 and thus close the motor circuit, current flowing through wire 158 to brush 139 and through segment 144 over wire 160 to armature terminal A² (instead of terminal A¹ as before), the circuit then flowing from armature terminal A¹ over wire 166 to segment 145, thence through brush 140 over wire 162 and through closed switches 150 and 154 to return wire 163. As before, the field windings are fed by current passing over wires 158, 164 to field terminal F¹ and from terminal F² over lead 165 and through switches 150 and 154 to return wire 163. The reversal of direction of flow of current through the motor armature without changing the direction of flow through the field—from A² to A¹ instead of from A¹ to A² as when the magazine unit was shifted forwardly—results in reversing the direction of rotation of the motor. Accordingly, since the magazine now moves backwardly the floating rack bar 126 will be moved forwardly and thus rotate switch element 129 counterclockwise until insulating member 141 again overlies the brushes 139, 140 and breaks the motor circuit.

Movement of the rack bar 126 is so timed relative to rotational movement it imparts to switch element 129 that breaking of the motor circuit occurs immediately upon arrival of the selected magazine or magazines in operating position. The rack bar, of course, will occupy a different position each time it stops, its position depending upon the location of the selected magazine or magazines in the stack thereof. Likewise, the radial stop position of the switch element 129 will differ according to the stop position of the magazine unit.

*Alternative embodiment*

Fig. 22 shows the power shifting mechanism in a somewhat modified form to adapt it to a machine of the general construction disclosed in Letters Patent No. 2,103,980 referred to in the opening paragraphs of the present specification. As in said patent, the several magazine supporting frames are secured together as by lower and upper tie plates or brackets B¹ and B² respectively at each side, Figs. 2 and 22, to form the rigid shiftable magazine unit. Instead of resting on an offset shaft as in the construction shown in Figs. 2 and 19, the lower end of the magazine unit rests freely on a cross shaft 167 which is not offset. Mounted on a stud in each of the lower side plates B¹ is a roller 168 adapted to ride on a cam plate 169, one plate being secured to the inner face of each of the machine frame members C disposed opposite each side of the unit. Cam plates 169 are so shaped as to impart to the lower end of the unit during its shifting movement fore and aft, the raising and lowering action necessary to clear the escapement actuating reeds, this action being similar to that imparted by the offsetting of shaft 78 relative to shaft 80 in the construction previously described under the heading "Eccentric magazine motion." As before, the magazine unit is supported toward its upper end by rollers 75 carried on a cross shaft 74 in the lowermost magazine supporting frame B and adapted to ride on the tracks 76 on each side frame member C and the upper and lower shafts 74 and 167 are connected at each end by the bent links 86. Secured to shaft 167 toward each end thereof are pinions 83 and rollers 81 as in the construction already described, pinions 83 engaging toothed racks 84 secured to each side frame member C, see Fig. 23. The construction and operation of the parts thus far described is substantially the same as that disclosed in the above cited Patent No. 2,103,980. It may be pointed out here that the bent links 86 in the present instance are connected concentrically with shaft 167, the eccentric bushing 85 of the previously described embodiment being omitted due to the fact that their function is compensated for by the shape of the cam plates 169.

As in the previously described embodiment the lower magazine of an active pair must be retracted on its supporting frame before shifting the magazine unit in order that the lower end of the magazine may clear the upper ends of the escapement actuating reeds. Likewise, the channel entrance must be unlocked and swung to open position. Thus, in the present embodiment the same lever 1 with its finger trigger 3 for pulling Bowden wires 4 and 5 is provided for performing the various functions attendant upon these operations which have already been fully described. Also, in the present embodiment, there is provided, as before, the reversible gear reduction motor 122ᵃ with its drive shaft 121 coupled at 120 to the threaded spindle 118 journaled in suitable bearings. Comparing Figs. 19 and 23 it will be seen that in the latter figure, relating to the present embodiment, the spindle 118 is mounted on the inner rather than on the outer side of frame member C. This arrangement is chosen primarily for the purposes of convenience in adapting the power driving mechanism to a machine constructed along the lines of that disclosed in the cited Patent No. 2,103,980. Spindle 118, as before, is constantly in mesh with worm gear 117 on shaft 167 on which there is also provided a spur gear 170 meshing with a floating rack bar 171 arranged to slide fore and aft in suitable guide brackets 172 secured to frame C. Rack bar 171 is moved by spur gear 170 at a greater rate than movement of the magazine unit by rotation of pinions 83 which latter are of less pitch diameter than the spur gear 170 and as in the previously described embodiment this differential motion of the rack bar 171 is utilized to move an element of the modified control switch, now to be described, in such timed relation with the shifting movement of the magazine unit as to cut off the power drive as soon as the selected magazine or magazines arrive in operating position.

The control switch, according to the present embodiment, comprises two relatively movable elements, one being a contact box 173 secured by a bracket 174, Figs. 23, 24 and 25, to the rack bar 171 and the other element being a cam plate 175 slidable in grooves 176 in the box frame. A link 177 pivoted at 178 on plate 175 connects the latter to arm 179 of a two armed lever pivoted at 180 to a bracket 181 secured to the machine frame immediately above and to the right of the usual keyboard. The other arm 183 of the aforesaid lever extends forwardly through a vertical slot (not shown) in a cover plate 182 extending across the front of the machine and is provided with a handle or knob 183ᵃ. Arm 183 is made flexible sidewise by insertion over a portion of its length of a flat springy blade member 184. A bracket 185 secured to machine frame member C supplements bracket 174 in supporting and guiding the contact box element 173 of the control switch as it moves fore and aft with the rack bar 171. Cover plate 182 is provided with three notches 182ᵃ, 182ᵇ and 182ᶜ each extending laterally at one side of the vertical slot through which lever arm 183 projects.

Accordingly, since lever 183 is pivoted and is connected to the movable cam plate element 175 of the control switch, the lever may be shifted vertically into the different notch positions in cover plate 182 and such shifting of the lever will result in longitudinal displacement of switch element 175 relative to the contact box 173 of the control switch. As with the control switch hereinbefore described such relative displacement of the switch elements effects closing of the motor circuit and operation of the magazine shifting mechanism until the circuit is broken, and breaking of the circuit is accomplished automatically when the newly selected magazine or pair thereof arrive in operative position in the machine. Also, as before, the direction of shifting movement of the magazine unit is dependent upon the direction of the displacement of switch element 175 relative to element 173, that is, whether lever 183 is shifted upwardly or downwardly from the position it last occupied.

The mechanism of the control switch of the present embodiment for closing and opening the motor circuit is shown in Figs. 24 to 30. The essential parts in the contact box 173 comprise two pivoted contact levers 186, 187 each carrying similar six point contact blocks of insulating material 188, 189 respectively, a terminal strip 190 carrying twelve terminals 191 corresponding to the contacts on levers 186, 187 and two pairs of trip levers 192, 193. Contact levers 186, 187 are pivoted on a vertical shaft 194 and guided at their free ends in slots 195 in a guide bar 196. Contact blocks 188 and 189 are of insulating material with the contact plates 197 and 198 respectively mounted thereon on studs 199 encircled by coil springs 200.

The terminal strip 190 is made of insulating material fastened as by screws 201, Fig. 25, to opposite side walls of the contact box, contacts 202 being suitably secured to the terminals 191 and being disposed so that six contacts lie opposite each of the corresponding contacts 197 and 198 on levers 186 and 187 respectively.

Trip levers 192 and 193 are pivoted on a vertical shaft 203, the pair of levers 192 being secured together by block 204 and the pair of levers 193 by block 205. Springs 206 constantly urge levers 192 and 193 counterclockwise about their pivots and springs 207 connect the short arms of lever units 192 and 193 respectively to the short arms of contact levers 186 and 187 thereby urging the free ends of the respective levers to swing in opposite directions about their pivots. As shown in Figs. 24, 25, 26 and 30, a U-shaped lever 208 is freely pivoted in bores 209 near the free ends of each pair of levers 192 and 193 and the free arms of levers 208 project into a recess 210 in contact levers 186 and 187 respectively. To each lever 208 is secured one end of a spring 212 the other end of each spring being secured by a screw 213 to the frame of the box. The function of levers 208 is to actuate contact lever 186 or 187 when the corresponding pair of trip levers 192 or 193 are actuated by cam plate 175 as will shortly be seen. However, it may be pointed out here that in the closed position of a set of contacts, shoulders 192ᵃ or 193ᵃ on trip levers 192 or 193 as the case may be rest on a stop bar 211 and in such position the free arms of levers 208 swing above their pivotal axis in bores 209 while the open position of a set of contacts the arms of levers 208 swing below the pivotal axis of the levers. Thus, levers 208 together with their respective levers 192 and 193 produce a toggle action when actuated.

Each of levers 192 and 193 are provided with cam surfaces 213 adapted to cooperate with rollers 214 or 215 carried respectively on adjustable cam blocks 216 and 217 secured to the cam plate element 175 of the control switch. Referring to Fig. 26, the cam plate element 175 is shown in normal position wherein all contacts are open, that is, contact levers 186 and 187 are both depressed. Such depression results from the position of cam plate element 175 of the control switch wherein the high points on cam surfaces 213 of the pair of levers 192 rest on rollers 214 of cam plate block 216 and the high points on like cam surfaces 213 of the pair of levers 193 rest on rollers 215 of cam plate block 217. In such position of the cam plate element 175 contact levers 186 and 187 are held depressed by engagement of the free arms of levers 208 against the lower wall of recess 210 in which position the arms lie below the pivotal center of the levers where they are held due to spring 212 being somewhat stronger than spring 207.

Figs. 27 and 29 show the cam plate element 175 shifted to the right or rearwardly as viewed in Fig. 22 by shifting the magazine selecting lever 183 of the control switch upwardly into notch 182b. Upon such movement of cam plate 175 rollers 214 move out of supporting relation with the cam surfaces 213 on the pair of trip levers 192 as clearly shown in Fig. 29, Fig. 29, merely ride on the top of block 217 which is about flush with the rollers 215 and thus remain inactive. Accordingly, levers 192 swing counterclockwise due to pull of springs 206 which are much stronger than the spring 212 so that lever 208 is thus forced to swing about its axis in bores 209 of the pair of levers 192. Such action of lever 208 results in swinging the contact lever 186 upwardly and thus closing the motor circuit through the six contacts 197 on block 188 and corresponding contacts 202 of the terminal strip 190 as shown in Fig. 27, the free arm of lever 208 swinging above the pivotal center of the lever where it is held by tension of spring 212 in engagement with the upper wall of recess 210.

Upon closing of the motor circuit as just described the magazine unit will be shifted forwardly in the machine due to rotation of shaft 167 by spindle 118 and concurrently, rotation of spur gear 170 on shaft 167 transmits rearward movement to floating rack bar 171 and contact box 173 secured thereto. It will now be seen that such movement of contact box 173 will result in moving the cam surfaces of trip levers 192 rearward into engagement with rollers 214 whereupon the trip levers will be cammed upwardly about their pivot shaft 203 against the tension of springs 206. As the free ends of levers 192 swing upwardly the axis of lever 208 will also swing upwardly and upon passing over dead center of the toggle created by the relative motion between these levers spring 212 will forcibly draw the free arm of lever 208 downward, thus swinging contact lever 186 downward and breaking the motor circuit due to opening of the contacts.

Should the magazine selecting lever 183 be shifted downwardly from an upper notch 182b to notch 182a, cam plate 175 of the control switch would, of course, be displaced forwardly relative to the contact box element of the switch. In such case rollers 215 would move out of supporting relation with the cam surfaces 213 on the pair of trip levers 193 and these levers would then swing downwardly due to tension of their springs 206. Lever 208 pivoted in these levers would then swing upwardly and thereby swing contact lever 187 upwardly, thus closing the motor circuit through the six contacts 198 on block 189 and corresponding contacts 202 of the terminal strip 190. Upon return of cam plate 175 by rack bar 171 to the position of engagement of rollers 215 with the cam surfaces 213 of levers 193 the latter would be caused to swing upwardly and result in opening the motor circuit in the same manner as described above in respect to trip levers 192.

From the foregoing it will be evident that the magazine selecting lever 183 may be shifted at will from any position it may occupy to any new position, whether adjacent to or remote from the original position, and the magazine unit will then start its shifting movement. Regardless of the amount of displacement of the camming element 175 by lever 183, the contact box element 173 will move in the same direction as that of displacement of element 175 and of movement of the magazine unit until the associated parts of the switch elements arrive back in normal position. Such normal condition is reached automatically when the selected magazine or magazines arrive in operative position in the machine, the power drive then being cut off due to opening of the contacts in the control switch. In Fig. 22 the camming element 175 is shown by dot-dash lines in its rearmost shifted position in which the selecting lever 183 would be located in notch 183c. In such position the rollers 214 and 215, Figs. 27 and 29, would be displaced somewhat further to the right than shown but this would simply mean that the contact box element 173 would be moved further to the right before the trip levers would again be actuated upwardly to break the motor circuit. Here again, as with the control switch of the previously described embodiment, movement of the contact box is in timed relation with the shifting movement of the magazine unit and it is to be observed that if a shift is made from the lowest to the highest magazine location there is no interruption in the shifting movement at intermediate locations.

In Figs. 22 and 22a there is shown an additional safety device for enabling the operator instantly to stop or interrupt the shifting movement of the magazine unit at any time, such precautionary measure being desirable in the event that unknown to the operator some incorrect condition should prevail or an attendant should be working at the rear of the machine where injury might result if the drive were not stopped.

As already pointed out, the magazine selecting lever 183 is flexible sidewise owing to the insertion over a portion of its length of the springy blade 184. This flexibility of lever 183 is utilized to actuate the spring plunger 218 of an electric safety switch 219 carried on the upright arm of a bracket 220, the base of which is suitably secured to a flange, not shown, in the bottom of bracket 181. Disposed between plunger 218 and lever 183 is a vertical plate 221 hinged on a vertical pin 222 suitably carried in bracket 181, plate 221 having a lip 223 which normally rests freely against the left side of lever 183 as viewed from the front of the machine. As hereinbefore mentioned, the notches 182a, 182b and 182c extend laterally at one side of the vertical slot in cover plate 182 through which lever 183 projects. Thus, it will be seen that when lever 183 is shifted vertically to a position opposite one or another of the aforesaid notches, the cam plate element 175 of the control switch will be displaced and thereby close the contacts in the contact box element as already described. However, before the motor circuit which passes through the contacts in the control switch can be completed, switch 219 must also be closed. This will be clear from the circuit diagram, Fig. 21, which will shortly be discussed.

Accordingly, in order to complete the motor circuit and thus start the shifting movement of the magazine unit it is necessary for the operator to exert sufficient sidewise pressure leftward on lever 183 to depress spring plunger 218 of the safety switch 219, such pressure at the same time slightly deflecting the flexible blade 184. The amount of sidewise pressure required to actuate the switch plunger is actually small but sufficient nevertheless to require a constant urge leftward on the lever in order to keep the electrical circuit closed.

Thus, the shifting movement of the magazine unit under the power of the driving motor can be stopped instantly at any point in the path of movement merely by a slight relaxation of the finger pressure on lever 183, spring plunger 218 and flexible blade 184 immediately responding to such relaxation.

The electrical circuit in connection with the control switch of the embodiment of the invention shown in Figs. 22 to 30 inclusive is diagrammatically illustrated in Fig. 21. In this instance the motor 122ᵃ is a three phase motor the direction of rotation of which, as well known, is accomplished by reversing any two of the leads. The two sets of six contacts 197 and 198 respectively mounted on insulating blocks 188 and 189 are represented and the corresponding contacts 202 on the insulated terminal strip 190 are also shown. When the set of contacts 197 close the motor circuit through corresponding contacts 202, the motor rotates in one direction to shift the magazine unit forwardly and when contacts 198 close the circuit through corresponding contacts 202 the motor rotates in the opposite direction to shift the magazine unit rearwardly. The change in direction of rotation of the motor upon closing one or the other of the sets of contacts 197 or 198 with corresponding contacts 202 on the terminal strip results from reversal of the motor leads M² and M³. Thus, tracing the circuit with contacts 197 closed it will be seen that current flows over wire L¹ through the safety switches 150, 154 and 219 (all safety switches are assumed to be closed), through contacts 202 and 197 to motor terminal M¹. Over wire L² the current flows to motor terminal M³ and over wire L³ the current flows to motor terminal M². Tracing the circuit with contacts 198 closed, current flows over wire L¹ as before to motor terminal M¹. Over wires L² and L³ current flows to motor terminals M² and M³ respectively.

In both embodiments of the invention as herein described it will be evident that the power drive and associated mechanism herein provided for shifting the magazine unit is entirely independent of the usual mechanism for driving the machine proper. Moreover, the arrangement of the control means as herein proposed for rendering the power drive operative and inoperative is such that the shifting movement is direct and continuous from one magazine location to another, that is, without interruption at intermediate magazine locations, and the drive is rendered inoperative automatically immediately upon arrival of any selected magazine or pair thereof in operative position. Further, the driving devices as a whole remain constantly in coupled relation with the shiftable magazine unit so that complicated and expensive clutch mechanisms are avoided, operation of the power drive herein proposed being dependent merely upon controlling the opening and closing of an electrical circuit. Such arrangement results not only in simplifying the construction but also in simplicity and convenience for the operator, the mere signalling for a desired magazine by the setting of the selecting lever provided bringing about the required change. Finally, response of the power drive to the control means herein provided is dependent upon the functioning of certain safety devices which assure proper conditioning of the machine prior to a shifting operation and thus avoid damage or delays which might otherwise occur.

Although both forms of the invention are shown in connection with a machine equipped with four magazines and having double assembling and distributing devices, the arrangement of the various parts and their mode of operation would be the same as described herein if applied to machines having single assembling and distributing devices. In the latter case it would only be necessary to provide a fourth notch position for the magazine selecting lever.

We claim:

1. In a typographical machine, the combination of a plurality of superposed matrix magazines shiftable fore and aft as a unit, driving mechanism for the machine proper, and driving mechanism including a reversible source of power all distinct from and operable wholly independent of the machine drive for shifting the magazine unit in either direction.

2. In a typographical machine, the combination of a plurality of superposed matrix magazines shiftable fore and aft as a unit, driving mechanism for the machine proper, and a separate reversible drive including a constantly connected source of power and operable as a whole independent of the machine drive for effecting shifting movement of the magazine unit in either direction.

3. In a typographical machine, the combination of a plurality of superposed matrix magazines shiftable fore and aft as a unit, driving mechanism for operating the machine proper in one direction, separate driving mechanism including a reversible motor and operable wholly independently of the machine driving mechanism for shifting the magazine unit in either direction, and control means for said motor drive adjustable to render the drive operative to shift said unit different predetermined extents in either direction according to the extent and direction of adjustment of said means.

4. In a typographical machine, the combination of a plurality of superposed matrix magazines shiftable fore and aft as a unit, driving mechanism for the machine proper, a reversible power drive distinct from the machine drive and in constant coupled relation with the magazine unit for shifting the latter in both directions, and manually adjustable control means adapted upon changing the setting thereof to render the power drive operative to shift the magazine unit different predetermined extents according to the amount of change in the setting of said control means.

5. In a typographical machine, the combination of a plurality of superposed matrix magazines shiftable fore and aft as a unit to present any selected magazine in operative position, driving mechanism for the machine proper, a reversible power drive operable independently thereof for shifting the magazine unit in either direction, and control means for said power drive, said means including a pair of relatively adjustable cooperating elements adapted according to their relative position to govern the starting and stopping of the power drive and to determine the extent of movement thereby of the magazine unit required to shift a selected magazine into operative position.

6. In a typographical machine, the combination of a plurality of superposed matrix magazines shiftable fore and aft as a unit to present any selected magazine in operative position, driving mechanism for the machine proper, a reversible power drive operable independent of the machine drive for shifting the magazine unit in either direction, and control means for governing the operation of the power drive, said means comprising a pair of relatively movable cooperating elements, an adjustable magazine selecting lever adapted upon movement to a selected position to effect displacement of one of said elements relative to the other element and thereby start the power drive, and a member actuated by the power drive and adapted automatically to stop the latter upon movement by said member of said other element an amount equal to the displacement effected by adjustment of the magazine selecting lever.

7. In a typographical machine, the combination of a plurality of superposed matrix magazines shiftable fore and aft as a unit to present any selected magazine in operative position, driving mechanism for the machine proper, a reversible power drive operable independent of the machine drive and in constant coupled relation with the magazine unit for shifting the latter in either direction, magazine selecting means adjustable manually from one to another of a series of positions representative of the locations of the magazines in the shiftable unit, and control means for governing the operation of the power drive, said control means comprising a switch element moved by the magazine selecting means and adapted to initiate operation of the power drive upon adjustment of said means and a cooperative switch element moved by the power drive and adapted to stop the operation thereof upon arrival of the selected magazine in operative position.

8. In a typographical machine, the combination of a plurality of superposed matrix magazines, a shiftable supporting frame in which the magazines are mounted, a rotatable shaft connected to said frame for shifting the latter fore and aft to present any selected magazine therein in operative position, a magazine selecting lever adjustable manually into different positions indicative respectively of the locations of the magazines in their supporting frame, a reversible motor having driving connections constantly coupled to said rotatable shaft, and control means actuated by the magazine selecting lever and adapted upon adjustment of the latter from one position to any other selected position to render the motor operative to shift the supporting frame until the magazine indicated by the position of the selecting lever arrives in operative position.

9. In a typographical machine, the combination of a plurality of superposed matrix magazines, a supporting frame in which the magazines are mounted, a rotatable shaft movably supported in the machine frame and connected to said supporting frame for shifting the latter fore and aft to present any selected magazine therein in operative position, magazine selecting means adjustable manually from one to another of a series of positions each designating a different magazine a reversible power drive including a motor having driving connections constantly coupled to the rotatable shaft, and a control switch for closing and opening the circuit to the driving motor, said switch comprising a pair of relatively movable cooperating elements, one moved by the magazine selecting means an extent determined by the adjustment thereof and operative to close the motor circuit and the other moved by the rotatable shaft and operative upon movement thereby an extent equal to the movement of the first mentioned element to open the motor circuit and thereby stop the power drive upon arrival of the selected magazine in operative position.

10. In a typographical machine, the combination of a plurality of superposed matrix magazines shiftable fore and aft as a unit to present any selected magazine in operative position, driving mechanism for the machine proper, a reversible motor drive including driving connections constantly coupled to said unit and operable independent of the machine drive for shifting the unit in either direction, magazine selecting means adjustable manually from one to another of a series of positions each designating a different magazine, and control means governing the operation of the power drive, said means comprising a pair of cooperating elements adapted upon displacement of one element relative to the other in a direction and to an extent determined by adjustment of the selecting means to initiate operation of the power drive and automatically to stop the operation thereof upon movement of the other element in the direction and to the same extent as the displacement of the first mentioned element and upon arrival of the selected magazine in operative position.

11. A combination as in claim 4, wherein the adjustable control means includes a magazine selecting lever adjustable from any one to any other of a series of positions corresponding in arrangement to the positions respectively of the magazines in the shiftable unit, and wherein a change in the position of said lever determines the amount of change in the setting of the control means.

12. A combination as in claim 3, including a magazine selecting lever for adjusting the control means and wherein said control means comprises a pair of switch elements having a normal cooperative relation for maintaining an open circuit to the driving motor in as many different positions of said means as there are operative positions for the magazines, said elements being relatively movable one from its normal cooperative relation with the other by the selecting lever and operative upon such movement to start the motor drive and the other from the same normal position by the driving mechanism to normal cooperative relation with the first mentioned element in the adjusted position of the control means corresponding to the operative position of the selected magazine.

13. In a typographical machine, the combination of a plurality of superposed matrix magazines shiftable fore and aft as a unit, driving mechanism for the machine proper and a motor drive operable independently thereof for shifting the magazine unit to present any selected magazine therein in operative position, a magazine selecting lever adjustable manually from one to another of a series of positions each representing a different magazine, and a control switch comprising a pair of elements cooperative to maintain an open circuit to the motor wherever a magazine is in operative position, one of said elements being movable out of cooperative relation with the other by the selecting lever an extent determined by the amount of adjustment thereof required for selecting a different magazine and adapted upon such movement to close the motor circuit, and the other element being movable by a member operated by the motor drive in time relation to the shifting movement of the magazine unit and adapted when restored to cooperative relation with the other element to open the motor circuit and thereby stop the motor drive upon arrival of the selected magazine in operative position.

14. A combination as in claim 5, including as a further element an adjustable magazine selecting lever adapted upon adjustment thereof to displace one element of the control means relative to the other element and thereby start the power drive, the extent of such displacement determining the extent of movement of the magazine unit required to shift a selected magazine into operative position, and wherein the other element of the control means is moved by the power drive at a different rate than movement thereby of the magazine unit and is adapted upon movement to the extent of the aforesaid displacement to stop the operation of the drive.

15. In a typographical machine, the combination of a plurality of superposed matrix magazines mounted in a shiftable frame, a reversible motor drive constantly coupled thereto and adapted solely for shifting said frame fore and aft to present any selected magazine therein in operative position, magazine selecting means and control means adjustable thereby for governing both the extent and direction of the shifting movement, said control means comprising relatively movable switch elements normally cooperating to maintain an open circuit to the driving motor and adapted upon manual displacement of one element relative to the other by the magazine selecting lever to effect operation of the motor drive until the other element is displaced automatically under control of the power drive to the same extent and in the same direction as the displacement of the first mentioned element.

16. A combination as in claim 3, including a magazine selecting lever for adjusting the control means and wherein the extent and direction of adjustment of said control means is dependent upon the location in the shiftable unit of a newly selected magazine relative to a previously selected magazine.

17. A combination as in claim 5, including as additional elements a manually adjustable magazine selecting lever and a member moved by the power drive in timed relation to the shifting movement of the magazine unit, and wherein starting of the power drive is effected upon adjustment of one of the elements of the control means in either direction relative to the other element by the magazine selecting lever, and movement of the other element by the aforesaid member in the direction and to the extent of adjustment of the first mentioned element effects stopping of the power drive.

18. In a typographical machine, the combination of a plurality of superposed matrix magazines shiftable as a unit in opposite directions to present any selected magazine in operative position, a reversible power drive for shifting said unit in either direction including control means governing the operation of said drive, a member operated manually prior to a shifting operation and adapted to detect obstructions to the shifting movement, and an auxiliary safety device adapted normally to prevent response of the drive to its control means, said device being actuated by the detecting member in the absence of obstructions to the operation thereof to permit operation of the drive in response to said control means.

19. A combination as in claim 18, wherein the detecting member comprises a bar movable laterally over the mouth of a magazine in operative position and engageable with matrices protruding therefrom, such engagement preventing movement of the bar to an extent sufficient to actuate the auxiliary safety device.

20. In a typographical machine, the combination of a plurality of superposed matrix magazines shiftable as a unit in opposite directions to present any selected magazine in operative position, reversible motor driven mechanism for shifting said unit in either direction including adjustable control means for closing and opening the motor circuit, a member operated manually prior to a shifting operation to detect obstructions in the path of shifting movement, and a normally open switch in series with the motor circuit and closed by said member in the absence of obstructions to the operation thereof to thereby permit operation of the motor drive in response to said control means.

21. In a typographical machine, the combination of a plurality of superposed matrix magazines shiftable as a unit in opposite directions to present any selected magazine in operative position, a reversible motor drive for shifting said unit in both directions, manually operated devices adapted prior to a shifting operation to move out of operative relation into the magazines members of the machine normally associated therewith, and safety switches connected in series with the motor circuit, one switch for each of said members, said switches being actuated by said manually operated devices to close the motor circuit and permit operation of the power drive upon movement of said members into inoperative position.

22. In a typographical machine, the combination of a plurality of superposed matrix magazines shiftable as a unit in opposite directions to present any selected magazine in operative position, a motor drive for shifting said unit and including a control switch governing the operation of the motor, manually operated devices adapted upon manipulation to a predetermined extent to condition the machine for a shifting operation, and normally open safety switches connected in series with the control switch and closed by said devices upon movement thereof the required extent to thereby permit operation of the motor drive.

23. A combination as in claim 3, including as an additional element a magazine selecting lever for adjusting the control means, said lever being adjustable from any one to any other of a series of positions each determining the operative position of a differently located magazine in the shiftable unit, and wherein the motor drive is operative upon adjustment of said lever to shift the magazine unit without interruption until the selected magazine indicated by the position of the lever arrives in operative position.

24. In a typographical machine, the combination of at least three superposed matrix magazines shiftable as a unit in opposite directions, a reversible power drive for shifting said unit in either direction to present any selected magazine therein in operative position, magazine selecting means adjustable from any one to any other of a series of different positions corresponding respectively to the positions of the magazines in the shiftable unit, and control means governing the operation of the power drive and determining the direction and extent of shifting movement thereby of said unit in accordance with the direction and extent of changes in the adjustment of the selecting means.

25. In a typographical machine, the combination of at least three superposed matrix magazines shiftable as a unit in opposite directions, a reversible power drive for shifting said unit in either direction to present any selected magazine therein in operative position, and control means governing the operation of the power drive including a magazine selecting lever adjustable from one to another of a series of positions each designating a different magazine in the shiftable unit and operative upon changing the adjustment thereof to permit operation of the power drive until the selected magazine arrives in operative position.

26. In a typographical machine, the combination of at least three superposed matrix magazines shiftable as a unit in opposite directions to present any selected magazine in operative position, a reversible power drive for shifting said unit in either direction, magazine selecting means adjustable from one to another of a series of different positions each designating a different magazine in the shiftable unit and adapted upon adjustment to render the power drive operative, and means cooperative with said selecting means at each position of adjustment thereof for automatically rendering the drive inoperative upon arrival of the selected magazine in operative position.

27. In a typographical machine, the combination of at least three superposed matrix magazines shiftable as a unit in opposite directions to present any selected magazine in operative position, reversible motor driven mechanism for shifting said unit in either direction, a magazine selecting lever adjustable manually from any one to any other of a series of positions each designating a different magazine in the shiftable unit, and a switch adapted to close the motor circuit to thereby render the driving mechanism operative upon manual retention of the selecting lever in a position designating a selected magazine.

28. A combination as in claim 27, wherein the switch for closing the motor circuit is normally retained open by a spring plunger and means is provided at each adjusted position of the magazine selecting lever to permit displacement thereof in a direction for actuating said plunger to close the switch.

29. A combination as in claim 27, wherein the magazine selecting lever is flexible in a direction lateral to that of its movement for adjustments and the switch is normally retained open by a spring plunger, and wherein a pivoted member is provided for actuating said plunger to close the switch upon lateral flexing of the selecting lever against said pivoted member.

30. In a typographical machine, the combination of a plurality of superposed matrix magazines shiftable as a unit in opposite directions, a reversible motor drive operative to shift said unit in either direction to bring any selected magazine into operative position, control means adapted upon manual adjustment to one or another selected position to condition the drive for a shifting operation and to determine the direction of shifting movement, and safety means operative to permit operation of the drive only while manually retaining said control means in adjusted position.

31. A combination as in claim 30, wherein the safety means comprises members actuated through manual pressure on the control means in any adjusted position of the latter and adapted when so actuated to effect closing of the circuit to the driving motor.

32. In a typographical machine, the combination of a plurality of superposed matrix magazines shiftable as a unit in opposite directions, a reversible motor drive for shifting said unit in either direction to bring any selected magazine into operative position, a magazine selecting lever adapted upon adjustment from one to another selected position to initiate operation of said drive, and a safety switch cooperative with the selecting lever and connected in series with the motor circuit, said switch being adapted during a shifting operation to close and open the motor circuit respectively upon exertion and relief of pressure manually on the magazine selecting lever.

33. In a typographical machine, the combination of a plurality of superposed matrix magazines shiftable as a unit in opposite directions, a reversible power drive for shifting said unit in either direction to bring any selected magazine into operative position, and control means governing the operation of said drive, said means being adjustable manually to different extents in either of two directions according to the position in the shiftable unit of a selected magazine relative to a magazine in use and the direction and extent of such adjustment determining the direction and extent of shifting movement of the magazine unit required to bring the selected magazine into operative position.

34. In a typographical machine having driving mechanism for the machine proper, the combination of a plurality of superposed matrix magazines shiftable as a unit in opposite directions, a reversible motor drive distinct from and operable independently of the machine drive for shifting said unit in either direction to bring any selected magazine into operative position, magazine selecting means adjustable to determine the direction and extent of shifting movement, and control means adapted to initiate operation of the motor in response to adjustments of the selecting means and to cooperate with the selecting means to render the motor inoperative automatically upon arrival of the selected magazine in operative position.

35. In a typographical machine, the combination of a plurality of superposed matrix magazines shiftable fore and aft as a unit, power driven mechanism adapted to run continuously in one direction for operating the machine proper, and separate reversible power driven mechanism for shifting the magazine unit in either direction, said latter mechanism including a reversible motor in constant operative connection therewith, manually adjustable control means for rendering the motor operative to effect a predetermined extent of shifting movement of the magazine unit in a desired direction, and means operative automatically to stop the motor upon completion of such shifting movement.

GEORGE W. ALLAN.
ALBERT H. SIMPSON.

DISCLAIMER 2,199,772.—*George W. Allan* and *Albert H. Simpson*, Brooklyn, N. Y. TYPOGRAPHICAL COMPOSING MACHINE. Patent dated May 7, 1940. Disclaimer filed January 29, 1942, by the assignee, *Intertype Corporation*.

Hereby enters this disclaimer to claims 1 and 2 of said patent.

[*Official Gazette March 17, 1942.*]